United States Patent
Lee et al.

(10) Patent No.: US 8,673,228 B2
(45) Date of Patent: Mar. 18, 2014

(54) SYSTEM FOR REDUCING ENVIRONMENTAL POLLUTANTS

(76) Inventors: Byung Chan Lee, Jeollanam-do (KR); Yong-Sik Jang, Jeollanam-do (KR); Kwang Hwan Lee, Jeollanam-do (KR)

( * ) Notice: Subject to any disclaimer, the term of this patent is extended or adjusted under 35 U.S.C. 154(b) by 538 days.

(21) Appl. No.: 12/937,010

(22) PCT Filed: Mar. 23, 2009

(86) PCT No.: PCT/KR2009/001458
§ 371 (c)(1),
(2), (4) Date: Jan. 7, 2011

(87) PCT Pub. No.: WO2009/125929
PCT Pub. Date: Oct. 15, 2009

(65) Prior Publication Data
US 2011/0286891 A1 Nov. 24, 2011

(30) Foreign Application Priority Data

Apr. 8, 2008 (KR) .................. 10-2008-0032755
May 6, 2008 (KR) .................. 10-2008-0041900

(51) Int. Cl.
*B01D 50/00* (2006.01)
*B01D 53/34* (2006.01)

(52) U.S. Cl.
USPC ........... 422/170; 422/168; 422/225; 422/162; 423/220

(58) Field of Classification Search
USPC ........... 422/168, 170, 172, 162; 423/220, 225
See application file for complete search history.

(56) References Cited

U.S. PATENT DOCUMENTS 4,354,936 A * 10/1982 Ishida et al. ............ 210/602
6,270,631 B1 * 8/2001 Anthony ................. 204/157.42

FOREIGN PATENT DOCUMENTS

| JP | 04-093510 A | 3/1992 |
|---|---|---|
| KR | 10-2000-0045135 | 7/2000 |
| KR | 10-2005-0094623 | 9/2005 |
| KR | 10-0811664 | 3/2008 |
| WO | PCT/ISA/210 | 11/2009 |
| WO | PCT/ISA/237 | 11/2009 |
| WO | WO2009-125929 A2 | 11/2009 |
| WO | WO2009-125929 A3 | 11/2009 |

* cited by examiner

*Primary Examiner* — Lessanework Seifu
(74) *Attorney, Agent, or Firm* — Duane Morris LLP

(57) ABSTRACT

The system for reducing environmental pollutants according to the present invention comprises: a first water immersion tank for producing strongly alkaline water by receiving a supply of bottom ash, which has been created by and has been accumulated at the bottom of a combustion furnace, and reacting it with water accommodated on its inside; an elimination reaction tank which is provided on a combustion pathway extending from the combustion furnace, and which internally accommodates the strongly alkaline water supplied from the first water immersion tank, and which also eliminates carbon-based compounds contained in exhaust gases which are discharged through the combustion pathway; a sludge-storage tank for receiving and storing sludge which has been produced as a consequence of the elimination reaction within the elimination reaction tank; a first aggregate storage tank for receiving and storing bottom-ash aggregate remaining within the first water immersion tank after the neutralization which follows as a consequence of the production of the strongly alkaline water; and a second water immersion tank for supplying the elimination reaction tank with strongly alkaline water which is produced by reacting water, accommodated on its inside, with a supply of fly ash which has been generated by the combustion furnace and has accumulated in a dust-collecting device on the combustion pathway.

41 Claims, 16 Drawing Sheets

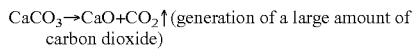

SYSTEM FOR REDUCING ENVIRONMENTAL POLLUTANTS

TECHNICAL FIELD

The present invention relates, in general, to a system for reducing environmental pollutants, and more particularly, to a system for reducing environmental pollutants capable of removing and purifying carbon compounds such as carbon dioxide generated from thermoelectric power plants, biogas generators, steel mills, or the like, and simultaneously neutralizing by-products generated from thermoelectric power plants, biogas generators, steel mills, or the like.

BACKGROUND ART

In general, carbon dioxide ($CO_2$) accounts for about 60% of the overall green house gases, and is a main factor of the global warming phenomenon. Carbon dioxide has been subjected to efforts and regulations to reduce its emission early on, on the basis of the United Nations Framework Convention on Climate Change (UNFCCC).

However, consumption of fuel for generating energy continues to increase, and thus it is difficult to reduce the emission of carbon dioxide itself.

In this regard, due to the recent introduction of carbon dioxide emission rights, each enterprise must reduce its emission of carbon dioxide to an allocated target value. If not, the carbon dioxide emission rights must be additionally purchased for the shortage, and thus the enterprises lose competitive power due to an increase in cost. In contrast, the enterprises that reduce their emission of carbon dioxide exceeding the allocated target value, can sell the carbon dioxide emission rights corresponding to the exceeded value, and thus create additional profits along with an image of an eco-friendly enterprise.

Thus, each enterprise has made a great deal of efforts to develop carbon dioxide reduction technology.

Particularly, in high energy consumption systems and processes such as thermoelectric power plants, reaction processes of producing biogas, biogas combustion systems, steel mills, cement factories, and so on, a large amount of carbon dioxide is discharged by the following mechanisms.

1. Thermoelectric Power Plants $C + O_2 \rightarrow CO_2 \uparrow$ (generation of a large amount of carbon dioxide)

2. Reaction Processes of Generating and Producing Biogas

Organic material + Digestive process → $CH_4 + CO_2$ (biogas)

Reclaimed waste + Microorganism degradation → $CH_4 + CO_2$ (biogas)

3. Biogas Combustion Systems (all Heat Engines Such as Thermoelectric Power Plants Using Liquefied Natural Gas (LNG) as Fuel)

$CH_4 + 2O_2 \rightarrow 2H_2O\uparrow + CO_2\uparrow$ (generation of a large amount of carbon dioxide)

4. Main Reaction of Refining Iron Ore at Steel Mills

Magnetite: $Fe_3O_4 + 2C \rightarrow 3Fe + 2CO_2\uparrow$ (generation of a large amount of carbon dioxide)

Hematite: $Fe_2O_3 + 3Co \rightarrow 2Fe + 3CO_2\uparrow$ (generation of a large amount of carbon dioxide)

5. Cement Factories $CaCO_3 \rightarrow CaO + CO_2\uparrow$ (generation of a large amount of carbon dioxide)

First, as coal fuel is burnt at the thermoelectric power plants, a large amount of carbon dioxide is generated by the mechanism (No. 1) above, and is contained in exhaust gases. For this reason, carbon dioxide generated at the thermoelectric power plants must be positively reduced.

Furthermore, inorganic residues, coal ash (i.e. ash), left after coal is burnt as fuel in the furnace of a coal thermoelectric power plant are generated as by-products. The coal ash is divided into bottom ash, which falls to and is deposited at a lower portion of the furnace, and fly ash, which is discharged through a flue at an upper portion of the furnace along with exhaust gases.

The fly ash is discharged through the flue in scattered particles of a fine size along with the exhaust gases, and thus is collected by a dust collector installed on the flue.

The bottom ash is formed so as to be changed into a somewhat large particle in the furnace by a sintering process, falls to and is deposited at a lower portion of the furnace, and is typically collected and pulverized into a size of about 1 mm to about 10 mm by a mill.

The coal ash was mainly buried in landfills additionally prepared at the power plant in earlier times. Recently though, due to a sharp increase in the price of the land, it has been difficult to secure landfills, and thus to dispose of the coal ash in the landfills.

In addition, the coal ash has been positively recycled recently. For example, fly ash has been mainly recycled for cement additives, fillers, soil conditioners, light-weight aggregates, and so on, and bottom ash has been mainly recycled for road bed fillers, base materials for pavement, aggregates for concrete mixture, and so on.

However, the recycled percentage has been low up to now, and a considerable part of coal ash has been simply buried. Thus, it is necessary to further extend the field capable of recycling the coal ash.

Meanwhile, the coal ash has a difference in their components depending on a kind of burned coal, a type of furnace, and so on, and basically contain calcium oxide (CaO) of about 2% to about 45%.

Thus, when the coal ash is buried or recycled, the contained CaO reacts with water, thereby producing calcium hydroxide ($Ca(OH)_2$) showing strong alkalinity greater than pH 12. As such, when recycled as a component for a structure, the coal ash cause damage to the structure due to hydration expansion, and are subjected to a partially bulging phenomenon. In contrast, when recycled as a component for reclamation or construction, the coal ash come into contact with underground water or rainwater, thereby producing strong alkaline leachate. This strong alkaline leachate is discharged to rivers or seas, thereby posing a risk of causing severe water pollution.

Accordingly, the coal ash is previously neutralized to prevent environmental pollution or structural damage from being caused when buried or recycled, and their recyclability needs to be expanded to other uses.

However, in carrying out neutralization and harmless treatment on the coal ash, excessive expenses or other environmental pollutions must not be incurred.

In other words, a satisfactory processing method in the economical and eco-friendly aspect must be adopted.

Next, biogas is burnt in the furnace for conversion into other energy such as electricity. Methane gas contained in the biogas reacts with oxygen. Thereby, a large amount of carbon dioxide is generated by the mechanism (No. 3) above, and is contained in exhaust gases. For this reason, carbon dioxide must be positively reduced in the biogas combustion systems.

One of the most anticipated alternative fuels to fossil fuel is biogas, which is expected to be able to be sufficiently put to practical use along with natural gas in the near future.

The biogas is automatically obtained by fermenting organic waste having a high content of biomass (organic material) such as livestock excrement, food waste, or sludge of a sewage disposal plant. The organic waste may be sufficient as a raw material, because it is continuously generated by human activities and various industrial activities.

In detail, when the organic waste containing a large quantity of organic material is digested in an anaerobic state where no oxygen exists, the biogas is produced by degradation of the organic material on the basis of the mechanism (No. 2) above, and is generated at the sewage disposal plant by the degradation of microorganisms on the basis of the mechanism (No. 2) above. The biogas is mainly made up of methane ($CH_4$) of about 60% to about 70% and carbon dioxide ($CO_2$) of about 30% to about 40%. That is, a large quantity of carbon dioxide is discharged when the biogas is produced and generated.

Here, for the anaerobic digestion, an anaerobic filter method in which carriers are installed in an anaerobic digestion tank using the adhesion of anaerobic microorganisms, or an upflow anaerobic sludge blanket (UASB) method using granulation based on self immobilization of microorganism is typically applied.

Since the biogas contains a large quantity of methane gas of about 60% to about 70%, it is typically burnt, thereby obtaining electric energy and heat energy.

However, when the biogas is burnt, a large quantity of carbon dioxide of about 30% to about 40% inhibits oxidation. As such, an amount of heat generated by combustion is small, and the resulting rate of conversion into electric energy and heat energy is low.

Thus, a great deal of effort has been made to solve this problem.

For example, there is a method of separating carbon dioxide contained in the biogas bit by bit, discharging it into the air, increasing the contained methane gas to a content of about 75% to about 80%, and reducing the contained carbon dioxide to a content of about 20%.

However, this method has a problem in that it cannot remove carbon dioxide exceeding that content.

Then, a large quantity of carbon dioxide ($CO_2$) is generated and discharged by the mechanisms (Nos. 3 and 4) accompanied with the combustion of fuel along with industrial waste such as slag and waste acid in a process of producing steel at the steel mill, a process of producing cement at the cement factory, or the like. For this reason, carbon dioxide must be positively reduced at the steel mills and the cement factories.

For recycling or harmless treatment of the industrial waste such as slag and waste acid, high expenses are additionally required, causing a burden on cost, and environmental pollution is additionally caused in the process.

However, research and development for reducing environmental pollutants such as carbon dioxide in the various fields as mentioned above have not yet produced satisfactory remarkable results in the aspects of efficiency, economical efficiency, industrial application value, and on-the-spot applicability.

DISCLOSURE

Technical Problem

Accordingly, the present invention has been made in an effort to solve the problems occurring in the related art, and an object of the present invention is to provide a system for reducing environmental pollutants, capable of efficiently removing the environmental pollutants including carbon compounds such as carbon dioxide discharged from various systems, and separately collecting and recycling carbon dioxide of high purity, thereby showing excellent characteristics in the efficient and economical aspects.

Further, another object of the present invention is to provide a system for reducing environmental pollutants, capable of removing carbon compounds such as carbon dioxide contained in exhaust gases using coal ash generated by them, and simultaneously neutralizing the coal ash.

Further, another object of the present invention is to provide a system for purifying biogas, capable of more perfectly removing carbon compounds such as carbon dioxide contained in biogas produced by fermentation of organic waste to enhance purity of contained methane gas, and producing a high quality of biogas having an excellent rate of energy conversion in the event of combustion.

Further, another object of the present invention is to provide a system for recovering energy from biogas, capable of efficiently removing carbon compounds such as carbon dioxide contained in exhaust gases generated when the biogas is burnt in order to convert the biogas into energy, and preventing environmental air pollution.

Further, another object of the present invention is to provide a system for purifying biogas to recover energy from the biogas, capable of removing carbon compounds such as carbon dioxide from the biogas produced from organic waste to thereby purify the biogas, and removing carbon compounds such as carbon dioxide from exhaust gases generated when the purified biogas is burnt to produce energy to thereby purify the carbon compounds.

Further, another object of the present invention is to provide a system for reducing environmental pollutants, capable of effectively and economically removing carbon compounds such as carbon dioxide generated in a process using strong acid emissions and strong alkaline emissions generated from industrial fields such as still mills and cement factories.

Further, another object of the present invention is to provide a system for reducing environmental pollutants, capable of producing energy without incurring expenses using industrial waste, for instance slag and waste acid, generated in quantities from industrial fields such as still mills and cement factories, and carrying out harmless treatment on the industrial waste.

The above objects, and other features and advantages of the present invention will become more apparent to those skilled in the art from exemplary embodiments of the present invention.

Technical Solution

In order to achieve the above object, according to one aspect of the present invention, there is provided a system for reducing environmental pollutants, which includes: a first water immersion tank receiving bottom ash, which is generated from a furnace and is collected on a bottom of the furnace, and reacting the bottom ash with water stored therein, and producing strong alkaline water; an elimination reaction tank provided on a flue extending from the furnace, storing the strong alkaline water supplied from the first water immersion tank therein, and removing carbon compounds contained in exhaust gases discharged through the flue; a sludge storage tank receiving and storing sludge produced by an elimination reaction in the elimination reaction tank; a first aggregate storage tank receiving and storing bottom-ash aggregate, which remains in the first water immersion tank after being neutralized with the produced strong alkaline water; and a second water immersion tank receiving fly ash, which is generated from the furnace and is collected by a dust collector on the flue, reacting the fly ash with water stored therein, producing strong alkaline water, and supplying the produced strong alkaline water to the elimination reaction tank.

The system may further include a second aggregate storage tank receiving and storing fly-ash aggregate, which remains in the second water immersion tank after being neutralized with the produced strong alkaline water. The system may further include: a supply pipe supplying the strong alkaline water, which is produced from the first and second water immersion tanks, to the elimination reaction tank; and a valve means provided on the supply pipe and selectively opened and closed to regulate the supply of the strong alkaline water from the first or second water immersion tank to the elimination reaction tank.

The first and second water immersion tanks may include impactors, which give repetitive impact to the bottom and fly ash stored therein, and extract a calcium oxide component for producing the strong alkaline water. The elimination reaction tank includes means for improving a contact proportion between the strong alkaline water and the exhaust gases, and the contact proportion improving means includes one selected from means for rotating the strong alkaline water, means for agitating the strong alkaline water, means for subdividing and injecting the exhaust gases, and means for aerating and injecting the exhaust gases.

The first and second aggregate storage tanks may include aggregate outlets for drawing out the aggregate stored therein. The sludge storage tank may include a sludge outlet for drawing out the sludge stored therein in an undried or dried state.

According to another aspect of the present invention, there is provided a system for reducing environmental pollutants, which includes: a biogas supply unit supplying biogas; a biogas conveyance pipe conveying the biogas supplied from the biogas supply unit; a purification tank which is provided on the biogas conveyance pipe, brings carbon compounds, which are contained in the biogas passing through the biogas conveyance pipe, into contact with strong alkaline water stored therein, and removes the carbon compounds to increase a content of contained methane; and a biogas storage tank storing the biogas purified by passing through the purification tank therein.

The system may further include a sludge storage tank, which receives and stores sludge produced by an elimination reaction in the purification tank. The strong alkaline water may include a calcium hydroxide component produced by a contact reaction of calcium oxide with water, and the sludge may include a calcium carbonate component produced by a contact reaction of the calcium hydroxide component with the carbon compounds.

The system may further include a waste water immersion tank, which receives one of slag, coal ash, calcium hydroxide ($Ca(OH)_2$), sodium hydroxide (NaOH), and potassium hydroxide (KOH), produces the strong alkaline water by a contact reaction of the supplied material with water stored therein, and supplies the produced strong alkaline water to the purification tank. The system may further include: a furnace burning the purified biogas supplied from the biogas storage tank to generate high-temperature heat; an exhaust gas discharge pipe conveying and discharging exhaust gases generated from the furnace by combustion; and an elimination reaction tank which is provided on the exhaust gas discharge pipe, brings carbon compounds, which are contained in the exhaust gases passing through the exhaust gas discharge pipe, into contact with strong alkaline water stored therein, and removes the carbon compounds. The system may further include: a sludge storage tank receiving and storing sludge produced by an elimination reaction in the purification tank and the elimination reaction tank; a decomposition tank decomposing the sludge supplied from the sludge storage tank using high-temperature heat generated from the furnace to produce calcium oxide; a calcium oxide storage tank receiving and storing the calcium oxide from the decomposition tank and supplying the calcium oxide to the purification tank and the elimination reaction tank or the waste water immersion tank; and a carbon dioxide collection tank receiving and storing carbon dioxide produced by a dissolution reaction in the decomposition tank.

According to yet another aspect of the present invention, there is provided a system for reducing environmental pollutants, which includes: a biogas storage tank, in which biogas is stored; a furnace burning the biogas supplied from the biogas storage tank to generate high-temperature heat; an exhaust gas discharge pipe conveying and discharging exhaust gases generated by combustion in the furnace; and an elimination reaction tank which is provided on the exhaust gas discharge pipe, brings carbon compounds, which are contained in the exhaust gases passing through the exhaust gas discharge pipe, into contact with strong alkaline water stored therein, and removes the carbon compounds.

The system may further include a waste water immersion tank, which receives one of slag, coal ash, calcium hydroxide ($Ca(OH)_2$), sodium hydroxide (NaOH), and potassium hydroxide (KOH), produces the strong alkaline water of a calcium hydroxide component by a contact reaction of the supplied material with water stored therein, and supplies the produced strong alkaline water to the elimination reaction tank. The system may further include: a sludge storage tank receiving and storing sludge produced by an elimination reaction in the elimination reaction tank; and a decomposition tank decomposing the sludge supplied from the sludge storage tank using the high-temperature heat generated from the furnace to produce calcium oxide that is a raw material required to produce the strong alkaline water. The system may further include: a calcium oxide storage tank receiving and storing the calcium oxide from the decomposition tank and supplying the calcium oxide to the waste water immersion tank; and a carbon dioxide collection tank receiving and storing carbon dioxide produced by a dissolution reaction in the decomposition tank.

Here, the furnace may be one selected from a boiler, an internal combustion engine, an external combustion engine, a steam engine, a cogeneration facility, and a heat exchanger.

According to still yet another aspect of the present invention, there is provided a system for reducing environmental pollutants, which includes: a waste water immersion tank storing water therein and producing strong alkaline water; a gas supply pipe supplying carbon compounds; an elimination reaction tank receiving and storing the strong alkaline water from the waste water immersion tank and removing the carbon compounds introduced through the gas supply pipe using the strong alkaline water; and an acid neutralization tank neutralizing strong acid emissions supplied through a strong acid supply pipe using the strong alkaline water.

The system may further include: a gas pressurizer supplying the carbon compounds, which are supplied through the gas supply pipe, under pressure; and a second elimination storage tank additionally removing the carbon compounds, which are primarily removed in and supplied from the elimination storage tank, using the strong alkaline water. The strong alkaline water in the second elimination storage tank may be moved back to the elimination storage tank after being used for an elimination reaction, and is used again for the elimination reaction.

The system may further include: a strong alkaline water neutralization tank receiving the strong alkaline water from the elimination reaction tank or the waste water immersion tank and neutralizing the supplied strong alkaline water with carbon dioxide; and a carbon dioxide generator supplying the carbon dioxide from the strong alkaline water neutralization tank.

Further, the carbon compounds of the exhaust gases may be supplied to the strong alkaline water neutralization tank. The carbon dioxide generator may react sludge, which is produced as a byproduct from the strong alkaline water neutralization tank, the elimination reaction tank, or the acid neutralization tank, with an acid solution, and may generate the carbon dioxide. The carbon dioxide gas remaining in a process of neutralizing the strong alkaline water in the strong alkaline water neutralization tank may be supplied to the elimination reaction tank.

The system may further include a strong alkali supply pipe supplying strong alkali emissions to be neutralized to the acid neutralization tank or the strong alkaline water neutralization tank. The system may further include: a second acid neutralization tank receiving the strong alkaline water from the waste water immersion tank, receiving the strong acid emissions via the strong acid supply pipe, and secondarily neutralizing the strong acid emissions, which are primarily neutralized in the acid neutralization tank, with a strong alkaline element; and a strong alkali supply pipe supplying strong alkali emissions to be neutralized to the second acid neutralization tank. The system may further include a sludge storage tank, which collects sludge generated as a byproduct in the acid neutralization tank, dries the sludge, and stores the sludge in a dried state.

The system may further include a slag neutralization tank, which immerses slag aggregate supplied from the waste water immersion tank into water, and neutralizes the slag aggregate using carbon dioxide supplied from a carbon dioxide generator, carbonated water supplied from a carbonated water producer, or a drying method of directly spraying the carbon dioxide, wherein sludge generated as a byproduct in the slag neutralization tank is used to produce the carbon dioxide, or is collected and stored.

According to still yet another aspect of the present invention, there is provided a system for reducing environmental pollutants, which includes: a strong alkaline water supply pipe supplying strong alkaline water; a gas supply pipe supplying carbon compounds; an elimination reaction tank receiving and storing the strong alkaline water from the strong alkaline water supply pipe, and removing the carbon compounds introduced through the gas supply pipe using the strong alkaline water; a strong alkaline water neutralization tank receiving the strong alkaline water from the elimination reaction tank or the waste water immersion tank and neutralizing the supplied strong alkaline water with carbon dioxide; a strong acid supply pipe supplying strong acid emissions to be neutralized; and an acid neutralization tank neutralizing the strong acid emissions supplied through the strong acid supply pipe using the strong alkaline water supplied from the strong alkaline water supply pipe.

Here, the carbon dioxide used in the strong alkaline water neutralization tank may be supplied from the gas supply pipe or a carbon dioxide generator. The carbon compounds flowing into the elimination reaction tank may be supplied from the gas supply pipe or the strong alkaline water neutralization tank. The strong alkaline water supplied through the strong alkaline water supply pipe may be produced and supplied using sludge produced as a by-product from the elimination reaction tank or the strong alkaline water neutralization tank.

According to still yet another aspect of the present invention, there is provided a system for reducing environmental pollutants, which includes at least one neutralization section. The at least one neutralization section includes: a slag inflow pipe to which slag is supplied; a slag impactor installed so as to be located in carbonated water, applying predetermined impact to extract calcium oxide remaining in the slag, and causing the extracted calcium oxide to react with the carbonated water to neutralize the slag; and a slag discharger discharging the neutralized slag to an outside.

The carbonated water may include saturated carbon dioxide, and the at least one neutralization section may further include a carbonated water inflow pipe additionally supplying the carbonated water.

The at least one neutralization section may further include a carbon dioxide inflow pipe supplying carbon dioxide for producing the carbonated water, and the carbon dioxide reacts with water loaded on the at least one neutralization section to produce the carbonated water.

Further, the system may further include a carbon dioxide generator producing carbon dioxide using sludge produced by a neutralization reaction of the carbonated water, and the carbon dioxide generated from the carbon dioxide generator may be used to produce the carbonated water.

Here, the carbon dioxide generator may cause the sludge to react with an acid solution to produce the carbon dioxide. The system may further include a carbonated water producer, which is interposed between the at least one neutralization section and the carbon dioxide generator and dissolves the carbon dioxide produced from the carbon dioxide generator into water to produce the carbonated water.

According to still yet another aspect of the present invention, there is provided a system for reducing environmental pollutants, which includes: a neutralization tank storing air and carbonated water in which carbon dioxide is included in a supersaturated state, and neutralizing alkaline leachate and producing sludge using the carbon dioxide; a carbon dioxide generator reacting an acid solution with the sludge to produce the carbon dioxide and supplying the carbon dioxide to the neutralization tank; and a carbonated water producer producing the carbonated water using the carbon dioxide produced from the carbon dioxide generator, and supplying the carbonated water to the neutralization tank.

The neutralization tank may be configured so that the alkaline leachate falls down to the air and the carbonated water, in which carbon dioxide is included in a supersaturated state, due to gravity. The system may further include a fine sludge processing tank to which fine sludge produced by a reaction of the alkaline leachate with the carbon dioxide in the air and the carbonated water is supplied.

The carbon dioxide generator may include: a sludge supply pipe introducing the sludge produced from the neutralization tank; an acid storage section in which the acid solution is stored; and a carbon dioxide generation section communicating with the sludge supply pipe and the acid storage section, and generating the carbon dioxide by a reaction of the sludge and the acid solution.

Here, the system may further include a sludge drying section, which communicates with the sludge supply pipe and dehydrates and dries the sludge.

According to still yet another aspect of the present invention, there is provided a system for reducing environmental pollutants, which includes: a waste water immersion tank storing water therein and producing strong alkaline water; a reaction tank heating the water stored therein by a reaction of the strong alkaline water supplied from the waste water immersion tank and waste acid supplied from a waste acid storage tank, and generating steam; a steam prime mover driven to produce energy using the steam supplied from the reaction tank; a sludge storage tank receiving and storing sludge produced by a reaction in the reaction tank; a heat source decomposing the strong alkaline water supplied from the waste water immersion tank with high-temperature heat to produce calcium oxide; and a calcium oxide storage tank receiving and storing the calcium oxide from the heat source and supplying the calcium oxide to the reaction tank.

Here, the waste water immersion tank receives one of slag including the calcium oxide, calcium hydroxide ($Ca(OH)_2$), sodium hydroxide (NaOH), and potassium hydroxide (KOH), and the steam prime mover may be a steam engine that obtains reciprocation energy using heat energy of the steam or a steam turbine that obtains rotation energy using heat energy of the steam.

Further, the waste acid storage tank may store and supply first waste acid in which sulfuric acid and nitric acid are main components, and the reaction tank may be receiving the first waste acid and may react the first waste acid with the strong alkaline water.

The waste acid storage tank may store and supply second waste acid in which hydrochloric acid is a main component. The system may further include an additional reaction tank heating water stored therein by a reaction of the strong alkaline water supplied from the waste water immersion tank and the second waste acid supplied from the waste acid storage tank to thereby produce steam, and an ionized water storage tank receiving and storing ionized water produced by a reaction in the additional reaction tank. The heated water in the reaction tank and the additional reaction tank may be drawn out and reused. The sludge in the sludge storage tank may be drawn out and reused.

The heat source may be receiving the ionized water from the ionized water storage tank, and may evaporate the ionized water with high-temperature heat to produce calcium chloride. The calcium oxide storage tank may supply the stored calcium oxide to the additional reaction tank. The system may further include a calcium chloride storage tank receiving and storing the calcium chloride from the heat source and supplying the calcium chloride to the additional reaction tank. The heat source may be one selected from an internal combustion engine, an external combustion engine, and a flue. The calcium oxide stored in the calcium oxide storage tank may be supplied to the waste water immersion tank. The calcium oxide in the calcium oxide storage tank and the calcium chloride in the calcium chloride storage tank may be drawn out and reused.

Advantageous Effects

According to the present invention, it is possible to eliminate and purify carbon compounds such as carbon dioxide using a large quantity of coal ash generated from a thermoelectric power plant, and to carry out neutralization and harmless treatment of the coal ash in that process. Thereby, two kinds of environmental pollutants generated when the thermoelectric power plant is operated can be made harmless.

Thus, it is possible to prevent environmental air pollution caused by carbon dioxide, and to positively cope with the carbon dioxide emission regulations that are becoming more and more strict to secure enterprise competitive power.

Further, it is possible to neutralize the coal ash, to expand their recycling fields, and to prevent water pollution or structural damage when the coal ash are buried or recycled.

Since the carbon dioxide is eliminated using the coal ash generated by themselves, the system for reducing environmental pollutants is very economical, has excellent on-the-spot applicability, and is eco-friendly because no environmental pollution occurs in the process.

Moreover, since the calcium carbonate is provided as a byproduct that can be usefully recycled, economical efficiency and applicability are excellent in this respect.

Further, according to the present invention, the carbon dioxide contained in the biogas produced by fermenting the organic waste can be more thoroughly eliminated to enhance purity of the contained methane gas to the utmost, so that it is possible to produce a high quality of biogas having an excellent rate of energy conversion when burnt.

The carbon compounds such as carbon dioxide generated when biogas is burnt to convert it into energy can be eliminated, so that it is possible to prevent environmental air pollution caused by the carbon dioxide, and to positively cope with the carbon dioxide emission regulations that are becoming more and more strict.

Further, according to the present invention, since slag can be recycled to effectively eliminate the carbon compounds such as carbon dioxide and carbon monoxide which are main greenhouse gases, to neutralize the strong acid emissions and the strong alkaline emissions, and to obtain useful materials such as calcium carbonate and slag aggregate as byproducts, the present invention is an eco-friendly method that can be applied to overall industrial fields such as air environmental fields, water treatment environmental fields, waste recycling fields, and raw material recycling fields, can secure economical efficiency, is excellent in the on-the-spot applicability and utility, and can secure the emission right while positively coping with the carbon dioxide emission regulation.

Furthermore, since the calcium oxide as the start raw material is recycled, it is possible to use the raw material to the utmost. Since only a small quantity of raw material is required, it is possible to achieve excellent economical efficiency and utility. Since the by-products that can be usefully recycled, such as calcium sulfate, calcium nitrate, calcium chloride, calcium carbonate, hot water, high-purity carbon dioxide, and calcium oxide, are provided, it is possible to achieve excellent economical efficiency and utility.

In addition, according to the present invention, it is possible to produce energy using slag and waste acid that are industrial waste, and to carry out harmless treatment on the slag and waste acid that are industrial waste. Thus, the production of energy and waste disposal are possible without separate expenses, so that it is possible to provide economical efficiency.

Moreover, it is possible to prevent the water environmental pollution caused by leachate generated by burying the slag and by the waste acid discharged without permission.

DESCRIPTION OF DRAWINGS

The above and other objects, features and advantages of the present invention will be more apparent from the following detailed description taken in conjunction with the accompanying drawings, in which.

MODES FOR INVENTION

Hereinafter, exemplary embodiments of the present invention will now be described in detail with reference to the accompanying drawings.

First, a system for reducing environmental pollutants in accordance with the present invention will be applied to a thermoelectric power plant.

Figure 1:
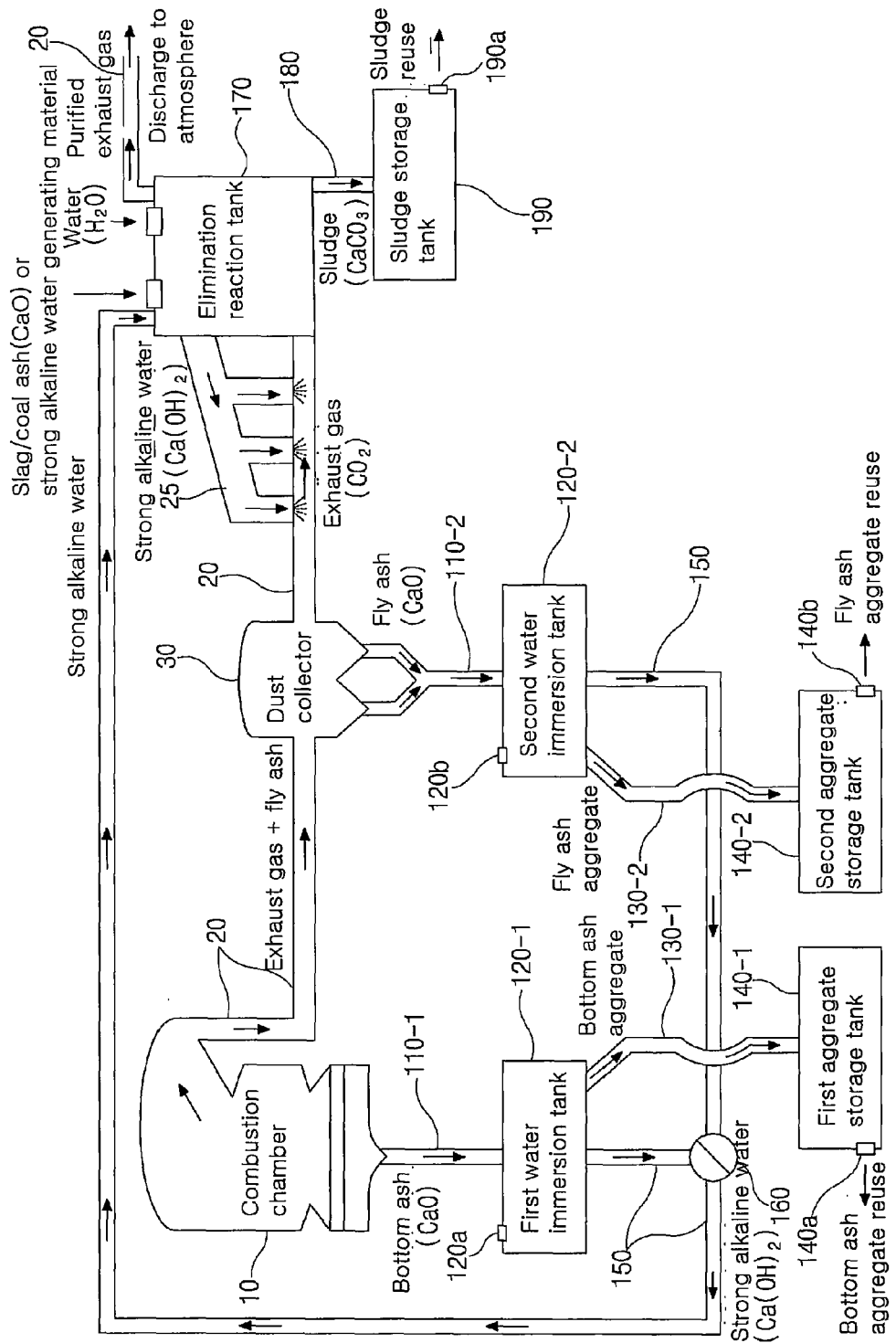
FIG. 1 is a schematic view showing a system for reducing environmental pollutants in accordance with a first exemplary embodiment of the present invention.

FIG. 1 is a schematic view showing a system for reducing environmental pollutants in accordance with a first exemplary embodiment of the present invention, which may be used in a thermoelectric power plant.

A coal-fired power plant uses coal fuel combusted in a combustion chamber of a furnace 10 to obtain a high temperature of heat energy. In this process, bottom ash is dropped and accumulated on a lower part of the furnace 10, and fly ash is discharged with an exhaust gas through a flue 20 extending from an upper part of the furnace 10. The fly ash discharged through the flue 20 is collected in a dust collector 30 installed on the flue 20.

The system for reducing environmental pollutants in accordance with a first exemplary embodiment of the present invention includes a first water immersion tank 120-1 for receiving a supply of bottom ash accumulated on the lower part of the furnace 10 to be extracted to the exterior and reacted with water contained therein to generate strong alkaline water, a second water immersion tank 120-2 for receiving a supply of fly ash collected by the dust collector installed on the flue 20 to be extracted to the exterior and reacted with water contained therein to generate strong alkaline water, a first elimination reaction tank 170 installed on the flue 20 behind the dust collector 30 and eliminating carbon compounds such as a carbon dioxide contained in the exhaust gas passing through the strong alkaline water supplied from the first and second water immersion tanks 120-1 and 120-2, a first aggregate storage tank 140-1 for receiving and storing bottom ash aggregate neutralized and remained due to generation of the strong alkaline water in the first water immersion tank 120-1, a second aggregate storage tank 140-2 for receiving and storing bottom ash aggregate neutralized and remained due to generation of the strong alkaline water in the second water immersion tank 120-2, and a sludge storage tank 190 for receiving and storing sludge produced due to an elimination reaction in the elimination reaction tank 170.

The bottom ash accumulated on the lower part in the furnace 10 is conveyed through the first conveyance pipe 110-1 to be input into the first water immersion tank 120-1. At this time, the conveyance may be performed through pneumatic conveyance, hydraulic conveyance, conveyor conveyance, free drop conveyance, and so on.

The first water immersion tank 120-1 receives the bottom ash supplied through the first conveyance pipe 110-1 in a state in which water is contained therein to generate strong alkaline water through a reaction between the water and bottom ash.

That is, since the bottom ash includes 2 to 45% quicklime (CaO), the CaO reacts with water according to the following reaction formula to generate calcium hydroxide ($Ca(OH)_2$), and the calcium hydroxide represents strong alkalinity of pH 12 or more.

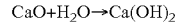

$$CaO+H_2O \rightarrow Ca(OH)_2$$

Meanwhile, the fly ash collected in the dust collector 30 installed on the flue 20 extending from the furnace 10 is conveyed through the second conveyance pipe 110-2 to be input into the second water immersion tank 120-2. At this time, similarly, the conveyance may be performed through pneumatic conveyance, hydraulic conveyance, conveyor conveyance, free drop conveyance, and so on.

The second water immersion tank 120-2 receives the fly ash supplied through the second conveyance pipe 110-2 in a state in which water is contained therein to generate strong alkaline water through a reaction between the water and the fly ash.

That is, since the fly ash includes CaO, the CaO reacts with water to generate calcium hydroxide ($Ca(OH)_2$), and the calcium hydroxide represents strong alkalinity of pH 12 or more.

Of course, the first and second immersion tanks 120-1 and 120-2 include water inlet ports 120a and 120b for receiving new water from the exterior, respectively.

The strong alkaline water containing $Ca(OH)_2$ generated through a reaction in the first and second water immersion tanks 120-1 and 120-2 is conveyed through supply pipes 150 to be supplied into the elimination reaction tank 170 according to an operation of a conveyance power providing means (not shown) such as a water pump. Here, when an amount of the strong alkaline water supplied from the first and second water immersion tanks 120-1 and 120-2 is not sufficient to eliminate carbon dioxide discharged from the combustion chamber, the strong alkaline water can be supplemented by directly supplying slag/coal ash including quicklime and water into the elimination reaction tank 170, or by directly supplying a strong alkaline water generating material such as calcium hydroxide ($Ca(OH)_2$), sodium hydroxide (NaOH), or potassium hydroxide (KOH) into the elimination reaction tank 170.

Here, the supply pipes 150 extending from the first and second water immersion tanks 120-1 and 120-2 may be converged and then connected to the elimination reaction tank 170 as a single pipe, and the valve means 160 may be installed at the converged position to selectively open/close and adjust a supply of the strong alkaline water from the first and second water immersion tanks 120-1 and 120-2.

Of course, the valve means 160 may completely open paths to the first and second water immersion tanks 120-1 and 120-2 to simultaneously supply the strong alkaline water from both the water immersion tanks 120-1 and 120-2.

Further, the first and second water immersion tanks 120-1 and 120-2 may include impactors (not shown) for repeatedly applying impacts to the coal ash inserted therein to more effectively and maximally extract the CaO contained in the coal ash.

The impactor is not limited as long as the impactor can repeatedly apply impacts to the coal ash, but may be implemented as a member installed into each water immersion tank 120-1 or 120-2 to perform lateral reciprocal movement or rotation.

When the CaO contained in the coal ash is eliminated as the strong alkaline water is generated in the first and second water immersion tanks 120-1 and 120-2, the coal ash remains in a neutralized aggregate state.

In addition, the remained coal ash aggregate is conveyed through corresponding aggregate conveyance pipes 130-1 and 130-2 to be stored in the aggregate storage tanks 140-1 and 140-2, respectively. At this time, the conveyance may be performed through conveyor conveyance, conveyance by a spiral rotary body, and so on.

That is, the bottom ash aggregate remained in the first water immersion tank 120-1 is conveyed through the first aggregate conveyance pipe 130-1 to be stored in the first aggregate storage tank 140-1, and the fly ash aggregate remained in the second water immersion tank 120-2 is conveyed through the second aggregate conveyance pipe 130-2 to be stored in the second aggregate storage tank 140-2.

In addition, the aggregates stored in the aggregate storage tanks 140-1 and 140-2 are extracted to the exterior. In order to extract the aggregate to the exterior, aggregate outlet ports 140*a* and 140*b* are installed at the aggregate storage tanks 140-1 and 140-2, respectively.

The elimination reaction tank 170 is installed on the flue 20 behind the dust collector 30 to pass the exhaust gas discharged after elimination of the fly ash, and remove carbon compounds such as carbon dioxide contained in the exhaust gas using the strong alkaline water including $Ca(OH)_2$ supplied from the first and second water immersion tanks 120-1 and 120-2 and contained therein.

That is, the exhaust gas passes through the strong alkaline water including $Ca(OH)2$ contained therein, and thus, the strong alkaline water contacts the exhaust gas to eliminate carbon dioxide in the exhaust gas according to the following reaction formula.

$$Ca(OH)_2 + CO_2 \rightarrow CaCO_3 + H_2O$$

Specifically, the exhaust gas is introduced through the lower part of the elimination reaction tank 170, and the exhaust gas purified therein is discharged through the upper part of the elimination reaction tank 170 so that the introduced exhaust gas can pass upwardly through the strong alkaline water contained therein and then be discharged through the upper part.

At this time, in order to prevent the strong alkaline water contained therein from flowing backward into the flue 20 at which the exhaust gas is introduced from the elimination reaction tank 170, an anti-backflow means (not shown) may be appropriately installed at an inlet side.

The elimination reaction tank 170 may include a contact rate improving means (not shown) for improving a contact rate between the strong alkaline water and the exhaust gas so that the elimination reaction can be rapidly and more effectively performed.

The contact rate improving means may include a rotation means for rotating the strong alkaline water contained therein, an agitation means for agitating the strong alkaline water, a gas subdivision means for subdividing and injecting the introduced exhaust gas, and an aeration means for aerating and injecting the introduced exhaust gas.

In addition, in order to more effectively eliminate the carbon dioxide contained in the exhaust gas, the strong alkaline water supplied from the first and second water immersion tanks 120-1 and 120-2 or the strong alkaline water in the elimination reaction tank 170 is supplied into the flue 20 between the dust collector 30 and the elimination reaction tank 170 through the extraction pipe 25, so that the exhaust gas can first contact the strong alkaline water in the flue 20 between the dust collector 30 and the elimination reaction tank 170 to perform a primary elimination reaction of the carbon dioxide, and then, a secondary elimination reaction of the carbon dioxide can be fully performed in the elimination reaction tank 170.

Further, according to the elimination reaction in the elimination reaction tank 170, calcium carbonate ($CaCO_3$) sludge is generated as a reaction byproduct to be accumulated on the lower part, and the accumulated $CaCO_3$ sludge is conveyed through the conveyance pipe 180 to be stored in the sludge storage tank 190. At this time, the conveyance may be performed through conveyor conveyance, conveyance by a spiral rotary body, and so on.

The sludge storage tank 190 stores the $CaCO_3$ sludge supplied from the elimination reaction tank 170. Generally, the sludge storage tank 190 stores the calcium carbonate in a sludge state, but, unlike this, the calcium carbonate sludge may also be dried to be stored in a solid state.

In addition, the calcium carbonate stored in the sludge storage tank 190 may be extracted to the exterior to be appropriately reused for raw materials for manufacturing steel, cement and fertilizer or aggregate for construction. In order to extract the calcium carbonate to the exterior, a sludge extraction port 190*a* is installed at the sludge storage tank 190.

Meanwhile, the exhaust gas purified by removing carbon compounds such as the carbon dioxide contained while passing through the elimination reaction tank 170 is continuously conveyed through the flue 20 behind the elimination reaction tank 170, being ultimately discharged to the atmosphere.

At this time, since the exhaust gas passes halfway through the elimination reaction tank 170 to remarkably decrease a conveyance force thereof, a conveyance pressure providing means (not shown) may be appropriately installed on the flue 20 to add a conveyance force in the middle of the flue 20, smoothly discharging the exhaust gas. The conveyance pressure providing means may be a blower fan.

In addition, the system for reducing environmental pollutants of the thermoelectric power plant in accordance with an exemplary embodiment of the present invention may further include a control panel (not shown) to perform an overall operation control to enable an automatic operation. Further, an opening/closing means (not shown) for opening/closing a path to adjust a supply amount of a subject and control a conveyance time, and a flowmeter (not shown) and an oil pressure gauge (not shown) for measuring a conveyance flow rate and a conveyance pressure of the subject may be installed on the conveyance pipe or a supply pipe through which the subject is conveyed. Furthermore, a pH measurement means (not shown) may be installed in the first and second water immersion tanks 120-1 and 120-2 and the elimination reaction tank 170 to measure a hydrogen ion concentration.

Hereinafter, an operation of the system for reducing environmental pollutants in accordance with a first exemplary embodiment of the present invention will be described.

When the furnace 10 is operated to combust a coal material, the bottom ash generated due to the combustion is dropped and accumulated onto the lower part of the furnace 10, and the fly ash is discharged with the exhaust gas through the flue 20 extending from the furnace 10 to be collected by the dust collector 30 installed on the flue 20.

Next, the bottom ash accumulated on the lower part of the furnace 10 is extracted to be conveyed through the first conveyance pipe 110-1, and then, input into the first water immersion tank 120-1. The fly ash collected by the dust collector 30 is extracted to be conveyed through the second conveyance pipe 110-2, and then, input into the second water immersion tank 120-2.

Thus, the water previously contained in the first and second immersion tanks 120-1 and 120-2 reacts with the CaO contained in the input coal ash to generate the strong alkaline water including $Ca(OH)_2$.

At this time, the impactors installed in the first and second water immersion tanks 120-1 and 120-2 are operated to repeatedly apply impacts to the coal ash, more effectively extracting CaO from the coal ash.

Next, the strong alkaline water generated in the first and second water immersion tank 120-1 and 120-2 is conveyed through the supply pipe 150 according to an operation of the water pump installed on the supply pipe 150 to be supplied into the elimination reaction tank 170. At this time, supply of the strong alkaline water from both of the water immersion tanks 120-1 and 120-2 can be appropriately adjusted by the valve means 160 installed on the supply pipe 150.

As described above, as the strong alkaline water is generated in the first and second water immersion tanks 120-1 and 120-2, the quicklime is eliminated so that the bottom ash aggregate and the fly ash aggregate remained after neutralization are conveyed through the aggregate conveyance pipes 130-1 and 130-2 to be stored in the corresponding aggregate storage tanks 140-1 and 140-2, respectively.

Then, the bottom ash aggregate and the fly ash aggregate stored as described above can be extracted to the exterior to be appropriately reused when necessary.

Next, the strong alkaline water conveyed and supplied through the supply pipe from the first and second water immersion tanks 120-1 and 120-2 is contained in the elimination reaction tank 170.

Meanwhile, the exhaust gas discharged through the flue according to an operation of the furnace 10 after elimination of the fly ash by the dust collector 30 is introduced into the elimination reaction tank 170, and the introduced exhaust gas contacts and reacts with the strong alkaline water including $Ca(OH)_2$ contained therein to eliminate carbon compounds such as carbon dioxide.

At this time, the exhaust gas is introduced through the lower part of the elimination reaction tank 170 to move upward to pass through the contained strong alkaline water, being discharged through the upper part. The exhaust gas passed through the elimination reaction tank 170, which is purified by eliminating carbon compounds such as carbon dioxide, is continuously conveyed through the rear-side flue 20 to be ultimately discharged to the atmosphere.

In addition, $CaCO_3$ sludge is generated and accumulated in the elimination reaction tank 170 according to the elimination reaction performed therein, the accumulated $CaCO_3$ sludge is conveyed through the sludge conveyance pipe 180 to be stored in the sludge storage tank 190 when necessary, and the stored calcium carbonate can be extracted to the exterior and appropriately reused when necessary.

As a result, according to the present invention, since carbon compounds such as carbon dioxide and carbon monoxide contained in the air can be effectively eliminated using the coal ash generated in large quantities at the thermoelectric power plant, it is possible to prevent air pollution and actively deal with carbon emission regulations, which are gradually being tightened.

In addition, since the coal ash can be neutralized into a harmless state, it is possible to prevent environmental pollution or structural damage when the coal ash is buried or reused, and thus, the coal ash can be reused for various purposes.

Briefly, both carbon compounds in the exhaust gas and quicklime in the coal ash, which are environmental pollutants generated at the thermoelectric power plant, can be removed.

In addition, since no other environmental pollutant is generated in the process, it is very environmentally friendly. Further, since the system is a raw material self-reliance system using a raw material generated in itself and using additional water only, it is very economical and its field applicability is also very good.

Furthermore, since the calcium carbonate is also provided as a byproduct to be usefully reused for industrial raw materials or aggregates for construction, it is very economical and its field applicability is also very good.

Meanwhile, the system for reducing environmental pollutants in accordance with the present invention may be applied to a biogas purification apparatus and an energy collection apparatus.

Figure 2:
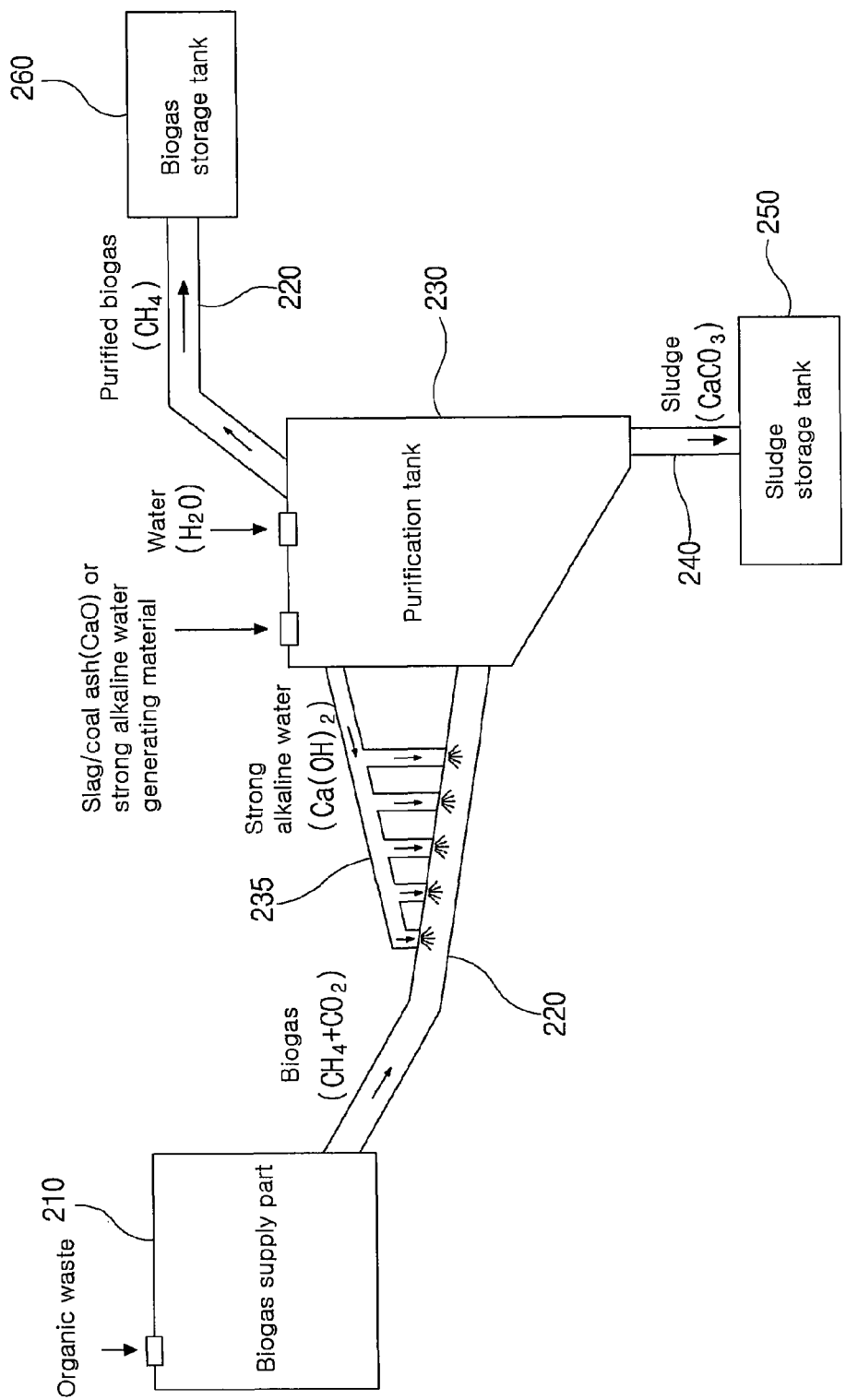
FIG. 2 is a schematic view showing a system for reducing environmental pollutants in accordance with a second exemplary embodiment of the present invention.

FIG. 2 is a schematic view showing a system for reducing environmental pollutants in accordance with a second exemplary embodiment of the present invention, which may be used for purification of a biogas.

The system for reducing environmental pollutants in accordance with the present invention includes a biogas supply unit 210 for supplying a biogas, a biogas conveyance pipe 220 for conveying the biogas supplied from the biogas supply unit 210, a purification tank 230 installed in the middle of the biogas conveyance pipe 220 and contacting carbon dioxide contained in the biogas passing therethrough with the strong alkaline water including calcium hydroxide ($Ca(OH)_2$) to eliminate the carbon dioxide to increase a content of methane gas, a biogas storage tank 260 for storing the purified biogas, and a sludge storage tank 250 for receiving and storing calcium carbonate ($CaCO_3$) sludge generated by the elimination reaction in the purification tank 230.

The biogas supply unit 210 ferments various organic wastes such as livestock excretions, food wastes, sludge of a sewage treatment plant, and so on, to generate and supply a biogas including methane gas and carbon dioxide as major elements.

The biogas supply unit 210 is not limited to specific treatment methods or constitutions but may use all treatment method or constitutions that are currently applied or to be developed and applied.

For example, the biogas supply unit 210 may include a digestion tank for receiving, fermenting and decomposing organic wastes appropriately pre-treated through solid-liquid separation, etc., to generate a biogas, and a post-treatment unit for eliminating various small amounts of harmful materials contained in the biogas generated in the digestion tank.

Meanwhile, in another embodiment, the biogas supply unit may be configured to collect and supply the biogas generated due to decomposition of wastes by microorganisms in a landfill, etc. In this case, input of the organic wastes is not necessary.

The purification tank 230 is installed in the middle of the biogas conveyance pipe 220 to pass the conveyed biogas therethrough, and the carbon dioxide contained in the biogas is eliminated using the strong alkaline water including calcium hydroxide contained therein.

That is, the biogas passes through the strong alkaline water including calcium hydroxide contained therein to contact each other to eliminate carbon dioxide contained in the biogas. At this time, an elimination reaction formula is as follows.

$$Ca(OH)_2 + CO_2 \rightarrow CaCO_3 + H_2O$$

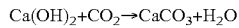

Figure 3:
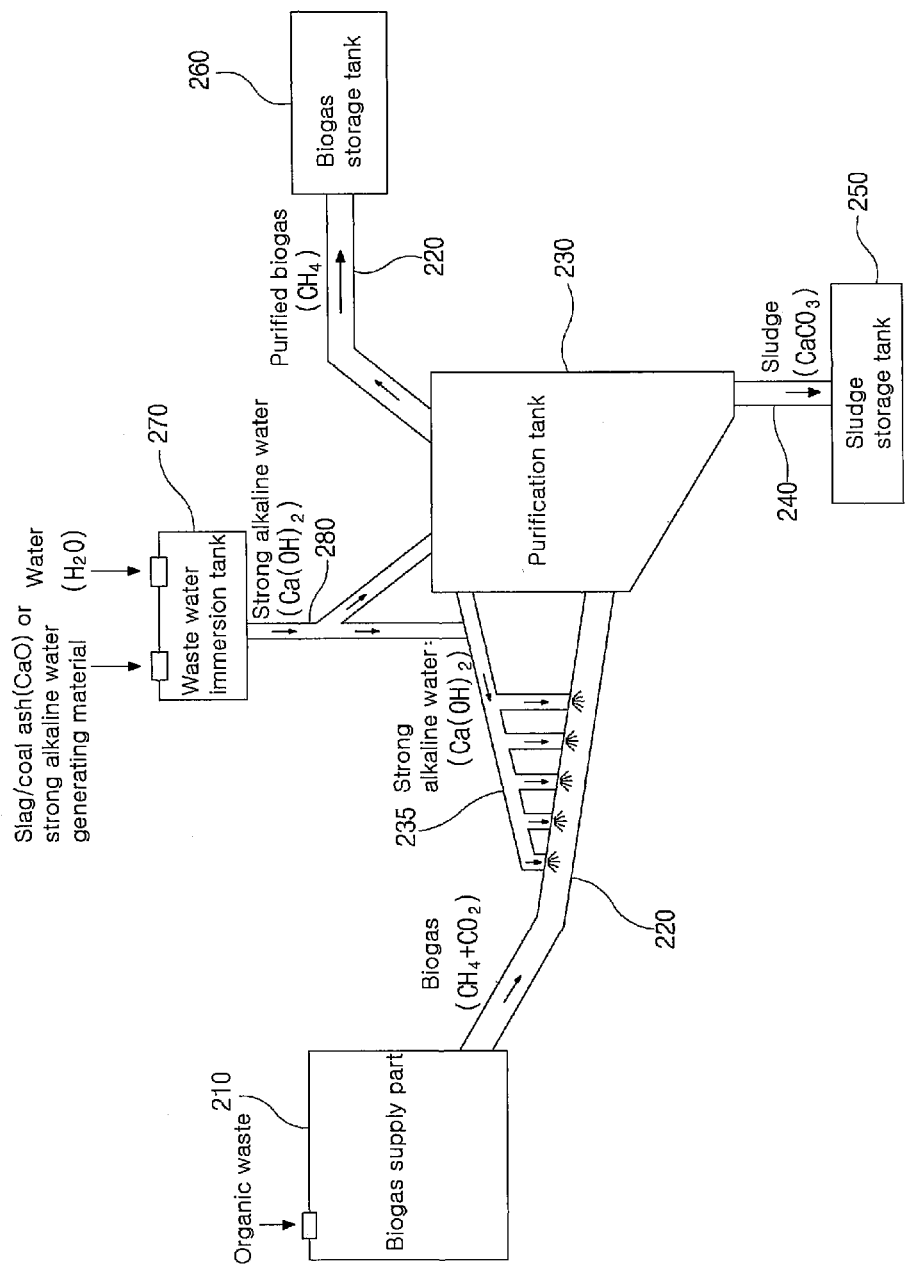
FIG. 3 is a schematic view showing a system for reducing environmental pollutants in accordance with a third exemplary embodiment of the present invention.

The purification tank 230 directly receives quicklime (CaO) and water from the exterior to react them with each other to generate the strong alkaline water including calcium hydroxide. Unlike this, in a system for reducing environmental pollutants in accordance with a third exemplary embodiment of the present invention shown in FIG. 3, the strong alkaline water may be supplied from the exterior. That is, a waste water immersion tank 270 connected to the purification tank 230 may be provided to supply slag/coal ash and water including quicklime as impurities into the waste water immersion tank 270, or supply water and strong alkaline water generating materials such as calcium hydroxide (Ca(OH)$_2$), sodium hydroxide (NaOH) and potassium hydroxide (KOH), so that the waste water immersion tank 270 generates the strong alkaline water, and the generated strong alkaline water can be supplied.

When the purification tank 230 directly generates the strong alkaline water, the strong alkaline water including calcium hydroxide of pH 10 to pH 12 or more is generated according to the following reaction formula.

$$CaO + H_2O \rightarrow Ca(OH)_2$$

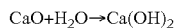

On the other hand, when the purification tank 230 receives a supply of the strong alkaline water from the exterior, a separate waste water immersion tank 270 is additionally provided to generate the strong alkaline water and supply it into the purification tank 230, and the corresponding waste water immersion tank 270 receives industrial wastes such as slag or coal ash (i.e., ash) to react with the water contained therein to generate the strong alkaline water including calcium hydroxide, supplying the strong alkaline water into the purification tank 230.

For example, the strong alkaline water can be generated from the coal ash to be supplied into the purification tank 230 using the system for reducing environmental pollutants in accordance with a first exemplary embodiment of the present invention.

The strong alkaline water including calcium hydroxide generated from the waste water immersion tank 270 is supplied into the purification tank 230 through the strong alkaline water conveyance pipe 280. At this time, a conveyance force may be applied by a conveyance drive means (not shown) such as a pump installed on the strong alkaline water conveyance pipe 280.

Further, the purification tank 230 may include a contact rate improving means (not shown) for improving a contact rate between the calcium hydroxide contained therein and carbon dioxide contained in the introduced biogas to rapidly and effectively perform the elimination reaction. The contact rate improving means may be a rotary means for rotating the contained strong alkaline water, an agitation means for agitating the strong alkaline water, a gas subdivision means for subdividing and injecting the introduced biogas, an aeration means for aerating and injecting the introduced biogas, or the like.

In elimination of carbon dioxide contained in the biogas in the purification tank 230 using the strong alkaline water, in order to further increase elimination efficiency, the strong alkaline water supplied from the waste water immersion tank 270 or the strong alkaline water in the purification tank 230 is extracted and supplied into the biogas conveyance pipe 220 in front of the purification tank 230 so that the biogas first contacts the strong alkaline water in a front side of the biogas conveyance pipe 220 to perform a primary elimination reaction, and then, a secondary elimination reaction is fully performed in the purification tank 230.

For this, an extraction pipe 235 for conveying and supplying the strong alkaline water supplied from the waste water immersion tank 270 or the strong alkaline water in the purification tank 230 into the biogas conveyance pipe 220 in front of the purification tank 230 may be provided, and an injection nozzle (not shown) for subdividing and injecting the strong alkaline water into the biogas conveyance pipe 220 may be installed at an end of the corresponding extraction pipe 235, and a conveyance drive means (not shown) such as a pump for conveying the strong alkaline water through the extraction pipe may be provided.

The calcium carbonate sludge is generated as a byproduct and accumulated in the purification tank 230 due to an elimination reaction performed therein, and the accumulated calcium carbonate sludge is conveyed through the sludge conveyance pipe 240 to be stored in the sludge storage tank 250. Here, a conveyance means (not shown) such as a spiral rotary body may be installed in the sludge conveyance pipe 240 to convey the sludge.

The biogas storage tank 260 receives the biogas purified by eliminating carbon dioxide while passing through the purification tank 230 and stores the purified biogas therein.

The sludge storage tank 250 stores the calcium carbonate sludge generated as the byproduct according to the elimination reaction in the purification tank 230 and supplied into the sludge storage tank 250. The stored calcium carbonate can be extracted to the exterior to be appropriately reused as raw materials for manufacture of steel, cement and fertilizer when necessary.

Figure 4:
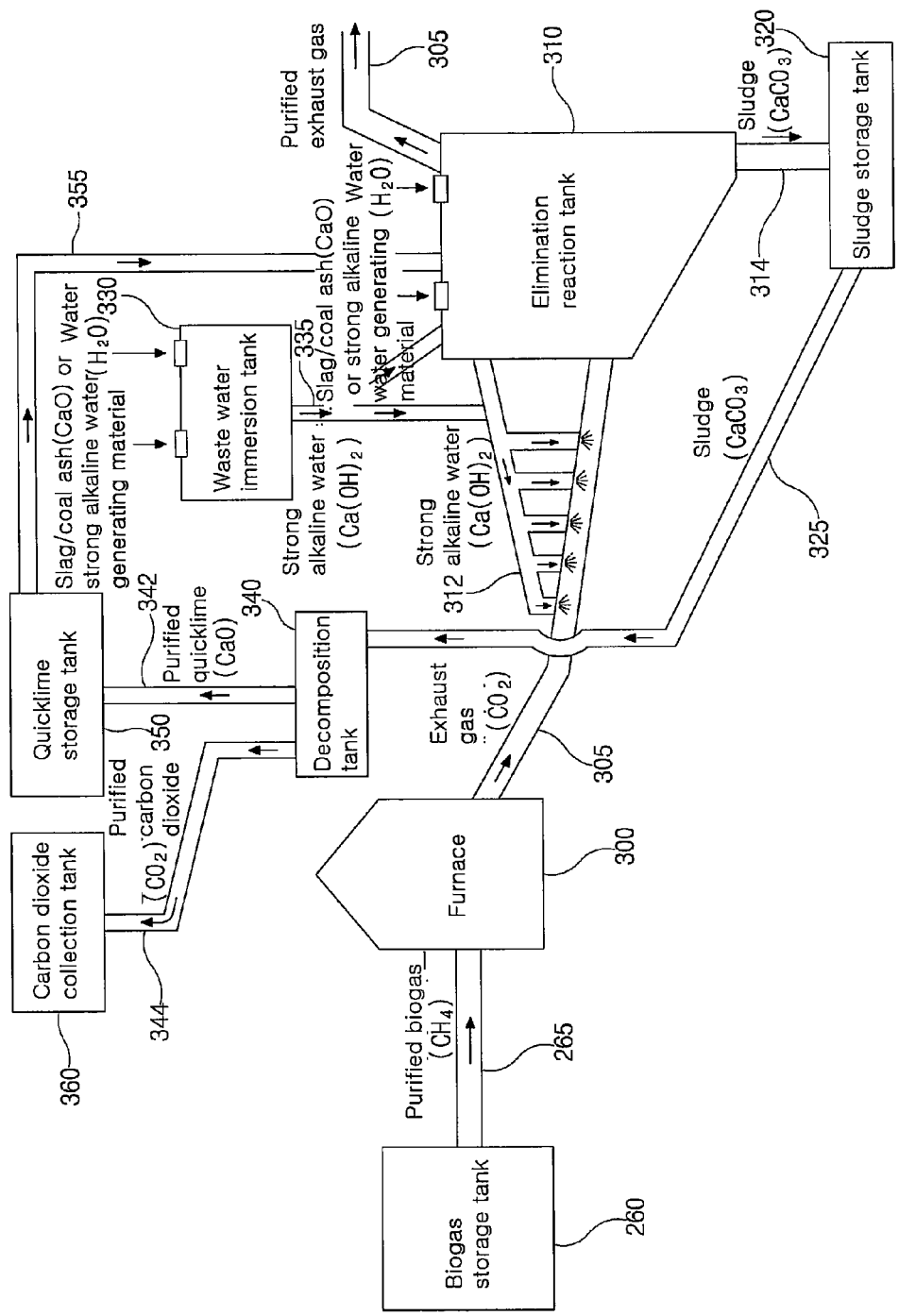
FIG. 4 is a schematic view showing a system for reducing environmental pollutants in accordance with a fourth exemplary embodiment of the present invention.

Meanwhile, FIG. 4 is a schematic view showing a system for reducing environmental pollutants in accordance with a fourth exemplary embodiment of the present invention.

The system for reducing environmental pollutants in accordance with the present invention may be used to collect biogas energy to generate energy by combusting a biogas purified through the biogas purification apparatus. At this time, carbon compounds such as carbon dioxide are eliminated from the exhaust gas to be discharged to the atmosphere.

The system includes a biogas storage tank 260 for storing the purified bio gas and supplying the biogas, a furnace 300 for combusting the purified biogas supplied from the biogas storage tank 260 to generate a large amount of heat, an exhaust gas discharge pipe 305 for conveying and discharging the exhaust gas generated due to combustion in the furnace 300, an elimination reaction tank 310 installed in the middle of the exhaust gas discharge pipe 305 and contacting carbon compounds such as carbon dioxide contained in the exhaust gas passed therethrough with the strong alkaline water including calcium dioxide to eliminate the carbon compounds, a sludge storage tank 320 for receiving and storing calcium carbonate sludge generated due to the elimination reaction in the elimination reaction tank 310, and a decomposition tank 340 for decomposing the calcium carbonate supplied from the sludge storage tank 320 using a large amount of heat generated from the furnace 300 to generate quicklime as a raw material.

The purified biogas stored in the biogas storage tank 260 is conveyed through a purified biogas conveyance pipe 265 to be supplied into the furnace 300.

The furnace 300 combusts the purified biogas to generate a large amount of heat, which is used to generate warm water or hot vapor, or other types of energy such as mechanical movement or electricity.

Therefore, it will be appreciated that the furnace 300 is included in a boiler, an internal combustion engine, an external combustion engine, a steam engine, an engine, a cogeneration plant, a heat exchanger, and so on.

When the biogas including methane gas as a major element is combusted in the furnace 300, a large amount of carbon dioxide is generated to be contained in the exhaust gas according to the following reaction formula.

$$CH_4 + 2O_2 \rightarrow 2H_2O\uparrow + CO_2\uparrow.$$

The exhaust gas discharge pipe 305 conveys and discharges the exhaust gas generated by combustion in the furnace 300.

The elimination reaction tank 320 is installed in the middle of the exhaust gas discharge pipe 305 to pass the conveyed exhaust gas therethrough to contact carbon compounds such as carbon dioxide contained in the exhaust gas with the strong alkaline water including calcium hydroxide contained therein, removing the carbon compounds.

That is, when the exhaust gas contacts the strong alkaline water including calcium hydroxide contained therein, the carbon dioxide contained in the exhaust gas is eliminated, and an elimination reaction formula at this time is as follows.

$$Ca(OH)_2 + CO_2 \rightarrow CaCO_3 + H_2O$$

The elimination reaction tank 310 may directly receive quicklime and water to generate calcium hydroxide according to a reaction therebetween, or may receive the strong alkaline water from a separate waste water immersion tank 330.

The waste water immersion tank 330 receives slag and coal ash wastes to react them with water contained therein to generate the strong alkaline water including calcium hydroxide, which is supplied into the elimination reaction tank 310. At this time, the strong alkaline water is conveyed through a strong alkaline water conveyance pipe 335. Otherwise, water and strong alkaline water generating materials such as calcium hydroxide (Ca(OH)$_2$), sodium hydroxide (NaOH) and potassium hydroxide (KOH) may be directly supplied into the waste water immersion tank 330 to generate the strong alkaline water.

In addition, in order to more effectively remove the carbon dioxide contained in the exhaust gas, the strong alkaline water supplied from the waste water immersion tank 330 or the strong alkaline water in the elimination reaction tank 310 may be supplied into the exhaust gas conveyance pipe (305) in front of the elimination reaction tank 310 through an extraction pipe 312 so that the exhaust gas first contacts the strong alkaline water in a front side of the exhaust gas conveyance pipe 305 to perform a primary elimination reaction, and then, a secondary elimination reaction is fully performed in the elimination reaction tank 310.

Of course, the exhaust gas purified through the elimination reaction tank 310 may be discharged through the exhaust gas discharge pipe 305 behind the elimination reaction tank 310 to be ultimately discharged to the atmosphere.

The sludge storage tank 320 stores the calcium carbonate sludge generated by the elimination reaction in the elimination reaction tank 310 and conveyed and supplied through a first sludge conveyance pipe 314, and the stored calcium carbonate may be extracted to the exterior to be reused as raw materials for manufacture of steel, cement and fertilizer when necessary.

In addition, the calcium carbonate stored in the sludge storage tank 320 is conveyed through a second sludge conveyance pipe 325 to be supplied into the decomposition tank 340.

The decomposition tank 340 decomposes the calcium carbonate supplied from the sludge storage tank 320 using a large amount of heat transferred from the furnace 300 to generate quicklime and carbon dioxide as raw materials according to the following reaction formula.

$$CaCO_3 \text{ (heating to } 860°\text{ C. or more)} \rightarrow CaO + CO_2\uparrow$$

According to the reaction formula, the calcium carbonate is decomposed into quicklime and carbon dioxide only when the calcium carbonate is heated to 860° C. or more. Since the furnace 300 in accordance with the present invention combusts the purified biogas, there is no oxidation-disturbing operation due to carbon dioxide, and thus, it is possible to generate a large amount of heat of 860° C. or more.

Preferably, the decomposition furnace 340 may be installed in the vicinity of the furnace 300 to easily receive a large amount heat from the furnace 300.

Further, the system for reducing environmental pollutants in accordance with a fourth exemplary embodiment of the present invention may further include a quicklime storage tank 350 for storing quicklime generated according to a decomposition reaction in the decomposition tank 340 and supplied thereinto and supplying the quicklime to the elimination reaction tank 310 to use it to generate calcium hydroxide, and a carbon dioxide collection tank 360 for receiving and storing high purity carbon dioxide generated according to the decomposition reaction in the decomposition tank 340.

Quicklime generated according to the decomposition reaction in the decomposition tank 340 is conveyed into and stored in the quicklime storage tank 350 through a first conveyance pipe 342, and carbon dioxide generated according to the decomposition reaction is conveyed through a third conveyance pipe 344 to be stored in the carbon dioxide collection tank 360.

The quicklime storage tank 350 stores the quicklime generated according to the decomposition reaction in the decomposition tank 340 and supplied thereinto, and the stored quicklime is conveyed through the second conveyance pipe 355 to be supplied into the elimination reaction tank 310 or the waste water immersion tank 330 to be used to produce calcium hydroxide.

Of course, the quicklime stored in the quicklime storage tank 350 may be extracted to the exterior to be reused as raw materials for industries or energy.

The carbon dioxide collection tank 360 stores high purity carbon dioxide generated according to the decomposition reaction in the decomposition tank 340 and supplied thereinto. In order to store a larger amount of carbon dioxide, the carbon dioxide may be stored in a compressed or cooled state. The carbon dioxide collected as described above may be reused as raw materials for plant husbandry to promote photosynthesis of plants or other industries.

In addition, the carbon dioxide stored in the carbon dioxide collection tank 360 may be conveyed and supplied into the exhaust gas discharge pipe 305 in front of the elimination reaction tank 310 to be eliminated.

Figure 5:
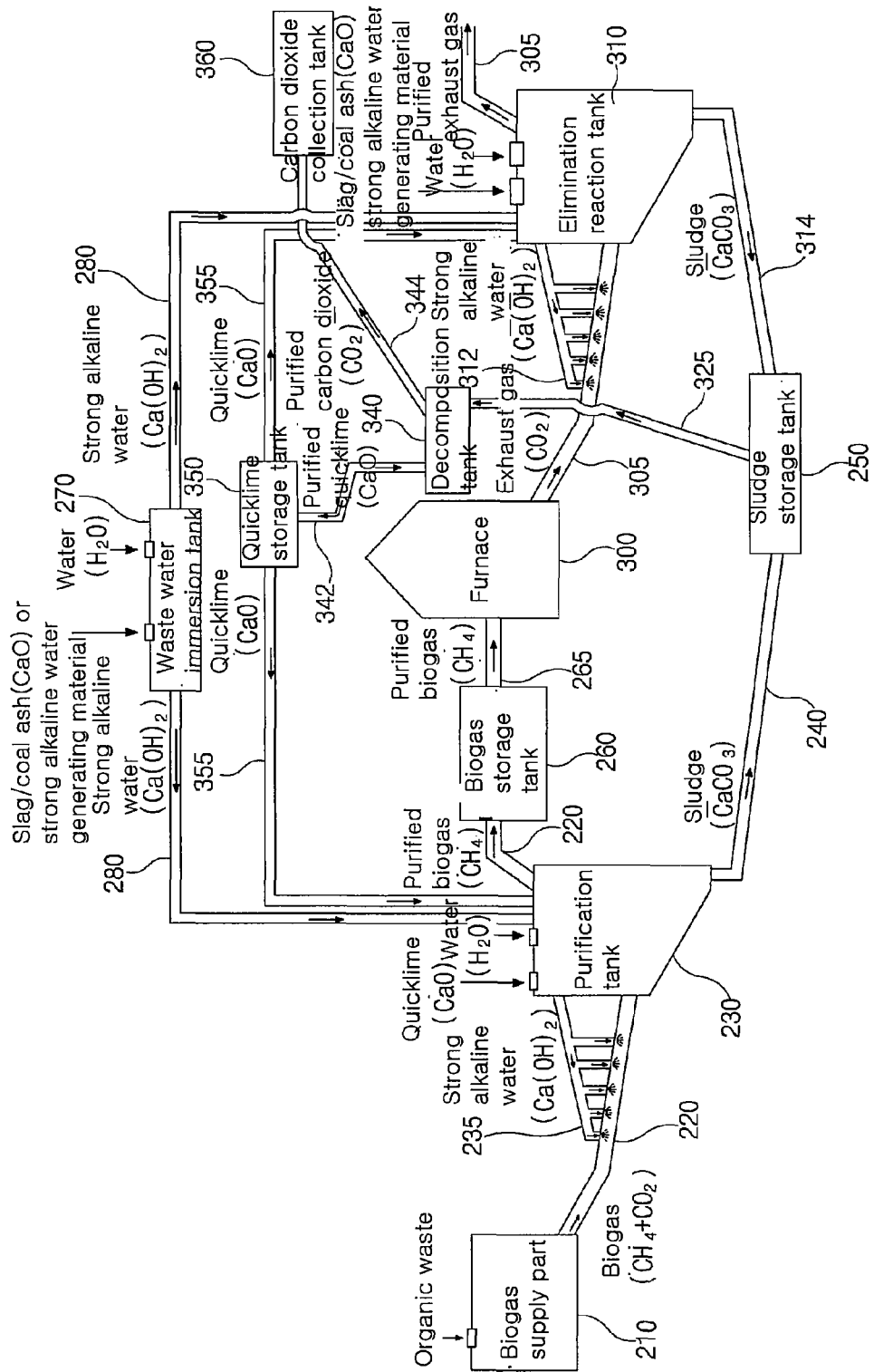
FIG. 5 is a schematic view showing a system for reducing environmental pollutants in accordance with a fifth exemplary embodiment of the present invention.

Meanwhile, FIG. 5 is a schematic view showing a system for reducing environmental pollutants in accordance with a fifth exemplary embodiment of the present invention, which may be used for biogas purification and energy collection.

The system for reducing environmental pollutants in accordance with a fifth exemplary embodiment of the present invention has a configuration in which the system for reducing environmental pollutants in accordance with a third exemplary embodiment of the present invention is combined with the system for reducing environmental pollutants in accordance with a fourth exemplary embodiment of the present invention, and like reference numerals designate like elements as described in the systems for reducing environmental pollutants in accordance with the third and fourth embodiments.

The system includes a biogas supply unit 210 for supplying a biogas, a biogas conveyance pipe 220 for conveying the biogas supplied from the biogas supply unit 210, a purification tank 230 installed in the middle of the biogas conveyance pipe 220 and contacting carbon dioxide contained in the biogas passing therethrough with strong alkaline water including calcium hydroxide to remove the carbon dioxide to increase a content of methane gas contained therein, a biogas storage tank 260 for storing and supplying the purified biogas, a furnace 300 for combusting the purified biogas supplied from the biogas storage tank 260 to generate a large amount of heat, an exhaust gas discharge pipe 305 for conveying and discharging the exhaust gas discharged according to combustion in the furnace 300, an elimination reaction tank 310 installed in the middle of the exhaust gas discharge pipe and contacting carbon compounds such as carbon dioxide contained in the exhaust gas passing therethrough with the strong alkaline water including calcium hydroxide, a sludge storage tank 250 for receiving and storing the calcium carbonate sludge generated by an elimination reaction in the purification tank 230 and the elimination reaction tank 310, and a decomposition tank 340 for decomposing the calcium carbonate supplied from the sludge storage tank 250 using a large amount of heat generated from the furnace 300 to generate quicklime as a raw material, which is to be supplied into the purification tank 230 and the elimination reaction tank 310.

In addition, the system may further include a quicklime storage tank 350 receiving and storing quicklime generated according to a decomposition reaction in the decomposition tank 340 and supplying the quicklime into the purification tank 230 and the elimination reaction tank 310, and a carbon dioxide collection tank 360 for receiving and storing high purity carbon dioxide generated according to the decomposition reaction in the decomposition tank 340.

Further, the system may further include a waste water immersion tank 270 for receiving slag and coal ash wastes to react them with water contained therein to generate strong alkaline water including calcium hydroxide, and then, supplying the strong alkaline water into the purification tank 230 and the elimination reaction tank 310.

The purified biogas stored in the biogas storage tank 260 is conveyed through a purified biogas conveyance pipe 265 to be supplied into the furnace 300.

The waste water immersion tank 270 causes the slag and coal ash wastes to react with water to generate the strong alkaline water including calcium hydroxide, and supplies the strong alkaline water into the purification tank 230 and the elimination reaction tank 310 through a strong alkaline water supply pipe 280. Otherwise, water and strong alkaline water generating materials such as calcium hydroxide ($Ca(OH)_2$), sodium hydroxide (NaOH) and potassium hydroxide (KOH) may be directly supplied into the waste water immersion tank 270 to generate the strong alkaline water.

In elimination of carbon dioxide contained in the biogas and the exhaust gas in the purification tank 230 and the elimination reaction tank 310 using the strong alkaline water, the strong alkaline water may be supplied into the biogas conveyance pipe 220 and the exhaust gas conveyance pipe 305 through extraction pipes 235 and 312 to perform a primary elimination reaction.

The quicklime generated according to the decomposition reaction in the decomposition tank 340 is conveyed through a first conveyance pipe 342 to be stored in the quicklime storage tank 350, and the quicklime stored in the quicklime storage tank 350 is conveyed through a second conveyance pipe 355 to be supplied into the purification tank 230 and the elimination reaction tank 310.

In addition, the carbon dioxide generated according to the decomposition reaction in the decomposition tank 340 is conveyed through a third conveyance pipe 344 to be stored in the carbon dioxide collection tank 360.

Further, a large amount of heat generated from the furnace may be conveyed to a digestion tank in the biogas supply unit 210 to be used to heat the digestion tank. When the digestion tank is heated, a digestion operation for generating a biogas can be more rapidly and effectively performed.

Furthermore, the system for reducing environmental pollutants may further include a control panel (not shown) to perform an overall operation control to enable an automatic operation. Further, an opening/closing means (not shown) for opening/closing a path to adjust a supply amount of a subject and control a conveyance time, and a flowmeter (not shown) and an oil pressure gauge (not shown) for measuring a conveyance flow rate and a conveyance pressure of the subject may be installed on the conveyance pipe or a supply pipe through which the subject is conveyed. Furthermore, a pH measurement means (not shown) may be installed in the tank for generating and storing the subject to measure a hydrogen ion concentration.

In addition, while the above embodiments have described that the strong alkaline water including calcium hydroxide is generated using quicklime as a raw material and carbon dioxide is eliminated using the strong alkaline water including calcium hydroxide, the strong alkaline water for removing carbon compounds such as carbon dioxide may use sodium hydroxide, potassium hydroxide, and so on.

As a result, according to the system for reducing environmental pollutants in accordance with the second to fourth embodiments, carbon dioxide contained in the biogas can be more completely eliminated to maximize a content of methane gas, producing high quality biogas. In addition, since the carbon compounds such as carbon dioxide contained in the exhaust gas discharged upon combustion of the biogas can be effectively eliminated to convert the biogas into energy, it is possible to prevent air pollution (destruction of the ozone layer, global warming, green house effect, and so on) due to carbon dioxide, and actively deal with carbon emission regulations.

In addition, since large amounts of slag and coal ash generated as wastes in industrial fields are used, it is very economical and its field applicability is also very good. Further, since no other environmental pollutant is generated in the process, it is very environmentally friendly. Furthermore, the slag and coal ash wastes can be treated to be harmless (neutralization treatment), environmental pollution generated due to simple disposal of the wastes can be prevented.

In addition, since the quicklime is repeatedly reused as a raw material, the raw material can be maximally used and a small amount of raw material can be used to provide economic feasibility and usability. Further, since calcium carbonate, high purity carbon dioxide and quicklime are also provided as byproducts to be usefully reused, it is very economical and its field applicability is also very good.

Meanwhile, the system for reducing environmental pollutants in accordance with the present invention may be applied to a steel mill.

Figure 6:
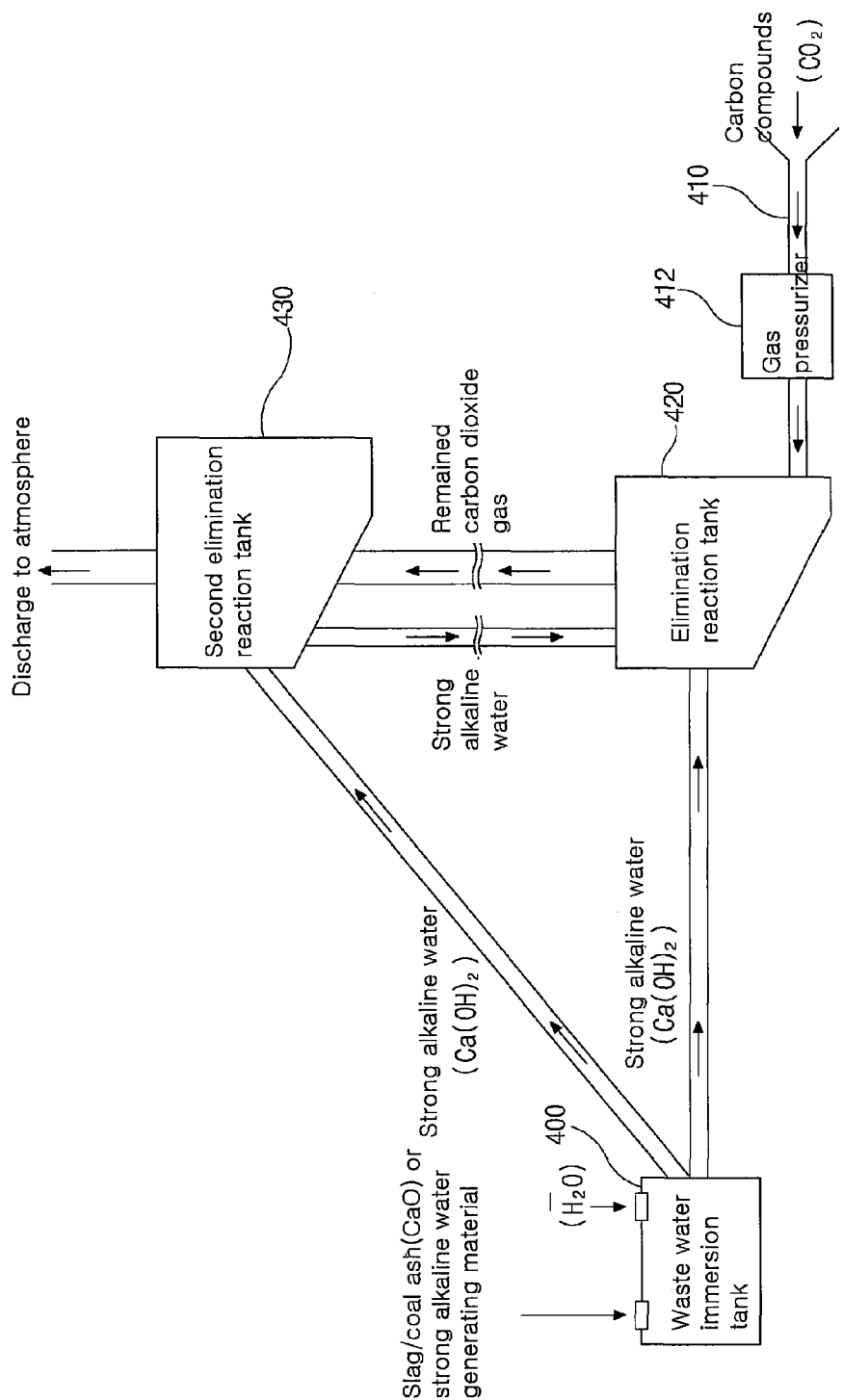
FIG. 6 is a schematic view showing a system for reducing environmental pollutants in accordance with a sixth exemplary embodiment of the present invention.

FIG. 6 is a schematic view showing a system for reducing environmental pollutants in accordance with a sixth exemplary embodiment of the present invention, which may be applied to a steel mill.

The system for reducing environmental pollutants in accordance with a sixth exemplary embodiment of the present invention can reuse a large amount of slag generated from a steel mill, and so on, to effectively eliminate carbon compounds such as carbon dioxide contained in an exhaust gas of a caloric engine, and so on, and carbon dioxide generated from a process in a steel mill, and so on.

The system for reducing environmental pollutants in accordance with a sixth exemplary embodiment of the present invention includes a waste water immersion tank 400 for receiving industrial wastes such as slag and coal ash (i.e., ash) to react with water contained therein to generate strong alkaline water including calcium hydroxide, a gas supply pipe 410 for supplying carbon compounds including carbon dioxide, which is to be eliminated, introduced from the exterior, and an elimination reaction tank 420 for receiving the strong alkaline water from the waste water immersion tank 400 to eliminate carbon dioxide introduced through the gas supply pipe 410.

The waste water immersion tank 400 may receive water and slag/coal ash including quicklime as impurities from the exterior in a state in which water is contained therein, or may receive water and strong alkaline water generating materials such as calcium hydroxide ($Ca(OH)_2$), sodium hydroxide (NaOH) and potassium hydroxide (KOH) to generate strong alkaline water.

For example, the slag is generated from a steel mill in which iron ore is made. In a steel manufacturing process, since limestone is also input to easily extract iron from iron ore, the discharged slag contains non-reacted quicklime (CaO). Thus, the quicklime of the slag reacts with water to generate calcium hydroxide ($Ca(OH)_2$), and the calcium hydroxide represents strong alkalinity of pH 10 to pH 12 or more.

In addition, the strong alkaline water may be generated from the coal ash using the system for reducing environmental pollutants in accordance with a first exemplary embodiment of the present invention.

As described above, since the slag or coal ash reacts with water to generate the strong alkaline water and the carbon dioxide is eliminated using the strong alkaline water, it is possible to prevent air pollution (destruction of the ozone layer, global warming, green house effect, and so on) due to carbon dioxide, and actively deal with carbon emission regulations. In addition, since the slag or coal ash, which has normally been landfill-treated, is reused, it is possible to obtain economical benefit. Further, it is possible to reduce water pollution such as river contamination or seawater pollution due to leachate caused by contact between the buried slag or coal ash and groundwater or rainwater.

The waste water immersion tank 400 receives water and slag/coal ash including quicklime as impurities from the exterior in a state in which water is contained therein, or receives water and strong alkaline water generating materials such as calcium hydroxide ($Ca(OH)_2$), sodium hydroxide (NaOH) and potassium hydroxide (KOH), generating strong alkaline water.

The strong alkaline water generated in the waste water immersion tank 400 may be supplied into the elimination reaction tank 420 using a water pump.

The elimination reaction tank 420 contains the strong alkaline water supplied from the waste water immersion tank 400, and causes the carbon dioxide introduced through the gas supply pipe 410 to react with the strong alkaline water contained therein to remove the carbon dioxide, generating calcium carbonate ($CaCO_3$) sludge as a byproduct caused by the reaction.

The elimination reaction tank 420 may include a contact rate improving means for improving a contact rate between the strong alkaline water contained therein and the carbon dioxide to maximize reaction efficiency. The contact rate improving means may be a rotary means for rotating the strong alkaline water, an agitation means for agitating the strong alkaline water, a gas subdivision means for subdividing and injecting the introduced carbon dioxide, and an aeration means for aerating and injecting the introduced carbon dioxide.

In addition, the elimination reaction tank 420 may be adjusted to a temperature or pressure appropriate to increase elimination efficiency of the carbon dioxide.

The gas supply pipe 410 collects carbon compounds such as carbon dioxide generated from all fields such as industrial fields, and so on, to supply them into the elimination reaction tank 420. That is, the carbon compounds introduced into the gas supply pipe 410 include all carbon compounds contained in an exhaust gas discharged after combustion from a caloric engine such as carbon dioxide, and so on, carbon dioxide generated from a manufacturing process in steel mills and cement plants, and other carbon compounds naturally generated from various industrial fields, regardless of generation processes. Here, while the carbon compounds supplied through the gas supply pipe 410 have been described as including carbon dioxide, the system for reducing environmental pollutants in accordance with the present invention may eliminate carbon monoxide as well as carbon dioxide.

A gas pressurizer 412 may be installed on the gas supply pipe 410 to supply carbon dioxide in a pressurized state, improving elimination efficiency of the elimination reaction tank 420 and preventing the strong alkaline water in the elimination reaction tank 420 from flowing backward into the gas supply pipe 410.

Of course, an anti-backflow means (not shown) may be appropriately installed to directly block backflow of the strong alkaline water in the elimination reaction tank 420 into the gas supply pipe 410.

Meanwhile, the system for reducing environmental pollutants in accordance with the present invention may include a second elimination reaction tank 430 for additionally and completely eliminating carbon dioxide primarily eliminated in the elimination reaction tank 420.

The second elimination reaction tank 430 receives the strong alkaline water from the waste water immersion tank 400 and contains the strong alkaline water, similar to the elimination reaction tank 420, and eliminates the introduced carbon dioxide using the contained strong alkaline water to generate calcium carbonate sludge as a byproduct.

The second elimination reaction tank 430 is in communication with the elimination reaction tank 420 through a pipe so that the carbon dioxide primarily eliminated in the elimination reaction tank 420 is supplied into the second elimination reaction tank 430 to be secondarily eliminated. When two elimination processes are performed, the carbon dioxide is completely eliminated so that a carbon-eliminated gas can be ultimately discharged to the atmosphere.

Preferably, the second elimination reaction tank 430 may be disposed far from the elimination reaction tank 420. For example, the elimination reaction tank 420 may be installed adjacent to a place where carbon dioxide is generated, and the second elimination reaction tank 430 may be installed adjacent to a flue through which a harmless gas is ultimately discharged to the atmosphere.

The second elimination reaction tank 430 may include a contact rate improving means for improving reaction efficiency, similar to the elimination reaction tank 420, or may be adjusted to a specific atmospheric state. An anti-backflow device may be appropriately provided in the second elimination reaction tank 430 to prevent the strong alkaline water from flowing backward upon supply of carbon dioxide from the elimination reaction tank 420.

As the elimination reaction is performed in the elimination reaction tank 420 and the second elimination reaction tank 430, the calcium carbonate sludge is generated therein.

In addition, the strong alkaline water used to eliminate the carbon dioxide in the second elimination reaction tank 430 may be supplied into the elimination reaction tank 420 to be reused in the elimination reaction tank 420.

Further, the elimination reaction tank 420 and the second elimination reaction tank 430 may include a measuring means (not shown) for checking whether carbon dioxide is completely eliminated.

Figure 7:
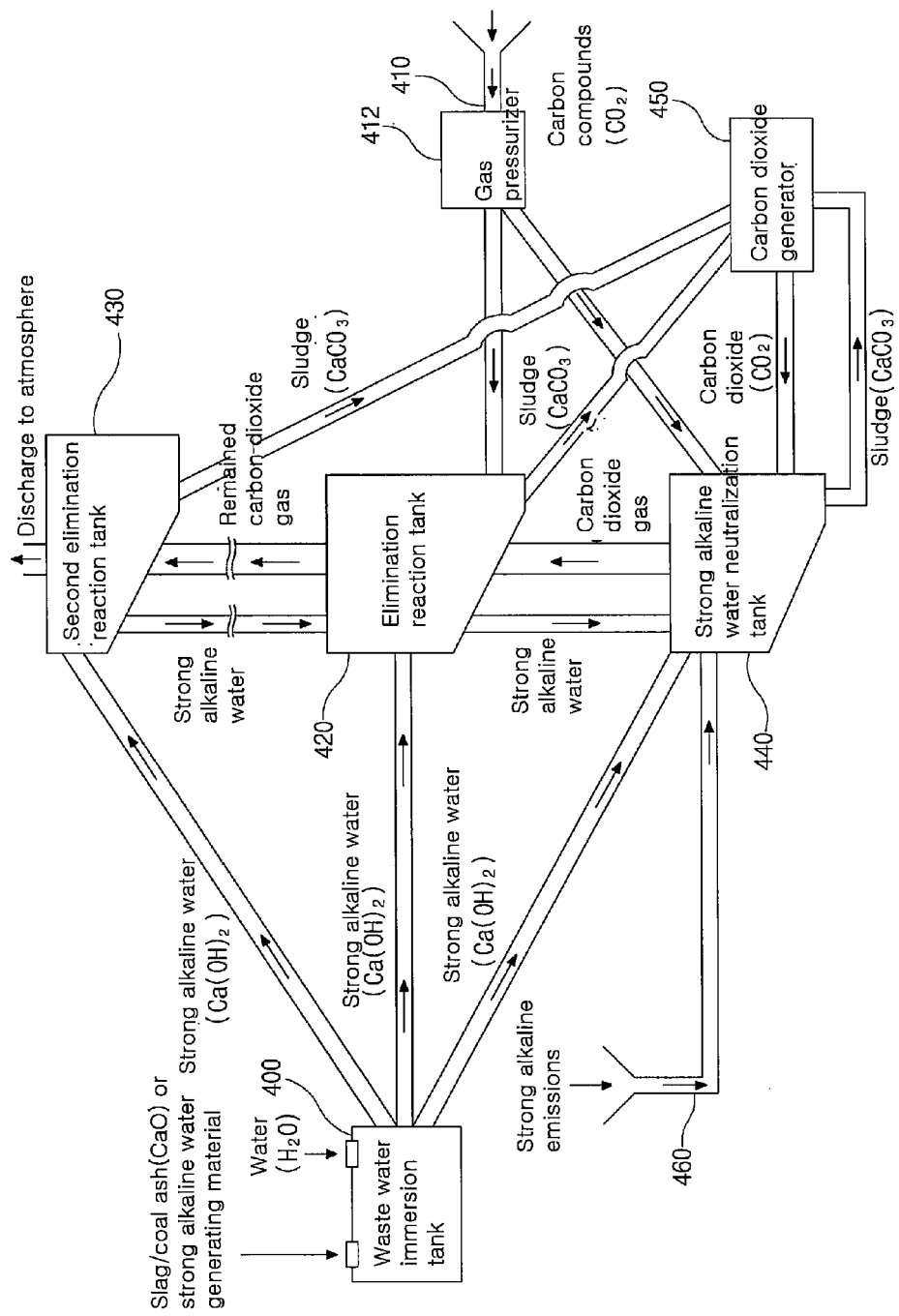
FIG. 7 is a schematic view showing a system for reducing environmental pollutants in accordance with a seventh exemplary embodiment of the present invention.

Meanwhile, FIG. 7 is a schematic view showing a system for reducing environmental pollutants in accordance with a seventh exemplary embodiment of the present invention, which may be applied to a steel mill.

As shown in FIG. 7, the system for reducing environmental pollutants in accordance with a seventh exemplary embodiment of the present invention may further include a strong alkaline water neutralization tank 440 for receiving the strong alkaline water supplied from the waste water immersion tank 400 or the elimination reaction tank 420 to neutralize the strong alkaline water using the carbon dioxide, and a carbon dioxide generator 450 for generating carbon dioxide to supply the carbon dioxide into the strong alkaline water neutralization tank 440.

The strong alkaline water neutralization tank 440 can neutralize the strong alkaline water directly supplied from the waste water immersion tank 400 and receive the strong alkaline water used in the elimination reaction tank 420 and the second elimination reaction tank 430 to neutralize the strong alkaline water.

At this time, in the latter case in which the strong alkaline water used in the elimination reaction tank 420 and the second elimination reaction tank 430 is received and neutralized, the strong alkaline water may be moved to the elimination reaction tank 420 when exchange of the strong alkaline water in the second elimination reaction tank 430 is needed, and the strong alkaline water may also be moved to the strong alkaline water neutralization tank 440 when exchange of the strong alkaline water in the elimination reaction tank 420 is needed.

Of course, unlike this, the strong alkaline water used in the second elimination reaction tank 430 may be directly moved into the strong alkaline water neutralization tank 440, not passing through the elimination reaction tank 420.

The strong alkaline water neutralization tank 440 neutralizes the introduced strong alkaline water using carbon dioxide supplied from the carbon dioxide generator 450 or carbonated water including carbon dioxide, generating calcium carbonate sludge as a byproduct.

Specifically, in the strong alkaline water neutralization tank 440, the calcium carbonate sludge and the neutralized water are generated as byproducts between the strong alkaline water and the carbon dioxide, the generated calcium carbonate sludge may be separated using a filter, and so on, and only the neutralized water may be discharged.

The strong alkaline water neutralization tank 440 may include a contact rate improving means for improving a contact rate between the strong alkaline water and the carbon dioxide, and its atmospheric state can be appropriately adjusted.

The carbon dioxide generator 450 generates carbon dioxide to supply the carbon dioxide into the strong alkaline water neutralization tank 440.

The carbon dioxide generator 450 may receive the calcium carbonate sludge generated as a byproduct in the elimination reaction tank 420, the second elimination reaction tank 430 and the strong alkaline water neutralization tank 440 to generate carbon dioxide using the calcium carbonate sludge. That is, the carbon dioxide may be generated by causing the calcium carbonate sludge to react with an acid solution such as hydrochloric acid (HCl) through the following reaction formulae.

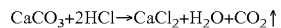

Of course, the carbon dioxide generator 450 is not limited to generating the carbon dioxide using the calcium carbonate sludge but may be applied to generate a sufficient amount of carbon dioxide without specific limitation. For example, the carbon dioxide generator 450 may collect and supply carbon dioxide contained in the air, or convert liquefied carbon dioxide or dry ice into carbon dioxide gas to supply it.

Further, the carbon dioxide generated from the carbon dioxide generator 450 may be converted into carbonated water to be supplied, not directly supplied into the strong alkaline water neutralization tank 440, further improving reaction efficiency. For this, a carbonated water manufacturer (not shown) may be further installed between the strong alkaline water neutralization tank 440 and the carbon dioxide generator 450 to convert carbon dioxide into carbonated water to supply the carbonated water.

The carbonated water manufacturer dissolves the carbon dioxide supplied from the carbon dioxide generator 450 in water to manufacture carbonated water. At this time, a specific temperature and pressure condition may be maintained to sufficiently saturate the carbon dioxide in the water.

Meanwhile, the carbon dioxide, which is to be eliminated, supplied through the gas supply pipe 410 is first supplied into the strong alkaline water neutralization tank 440 to neutralize the strong alkaline water, so that the carbon dioxide can be primarily eliminated.

In this case, the carbon dioxide, which is to be eliminated, supplied through the gas supply pipe 410 is primarily eliminated in the strong alkaline water neutralization tank 440, moved to the elimination reaction tank 420 to be secondarily eliminated, and then, moved to the second elimination reaction tank 430 to be thirdly eliminated, more completely eliminating the carbon dioxide in comparison with the case using the elimination reaction tank 420 and the second elimination reaction tank 430 only.

At this time, the carbon dioxide supplied into the strong alkaline water neutralization tank 440 through the gas supply pipe 410 may be converted into carbonated water to be supplied.

Of course, the carbon dioxide supplied through the gas supply pipe 410 may be appropriately divided and supplied into the strong alkaline water neutralization tank 440 and the elimination reaction tank 420.

Meanwhile, in accordance with the present invention, strong alkali emissions generated in industrial fields such as thermoelectric power plants, a steel mill, cement production plants, and so on, are collected to be supplied into the strong alkaline water neutralization tank 440, so that the strong alkali emissions can be neutralized to be harmless. For this, a strong alkali supply pipe 460 may be installed to be in communication with the strong alkaline water neutralization tank 440 to collect and supply the strong alkali emissions generated in industrial fields.

That is, the strong alkaline elements supplied into the strong alkaline water neutralization tank 440 may be supplied from the waste water immersion tank 440 or supplied through the strong alkali supply pipe 460. The strong alkali emissions generated in industrial fields are generally in a liquid phase.

Figure 8:
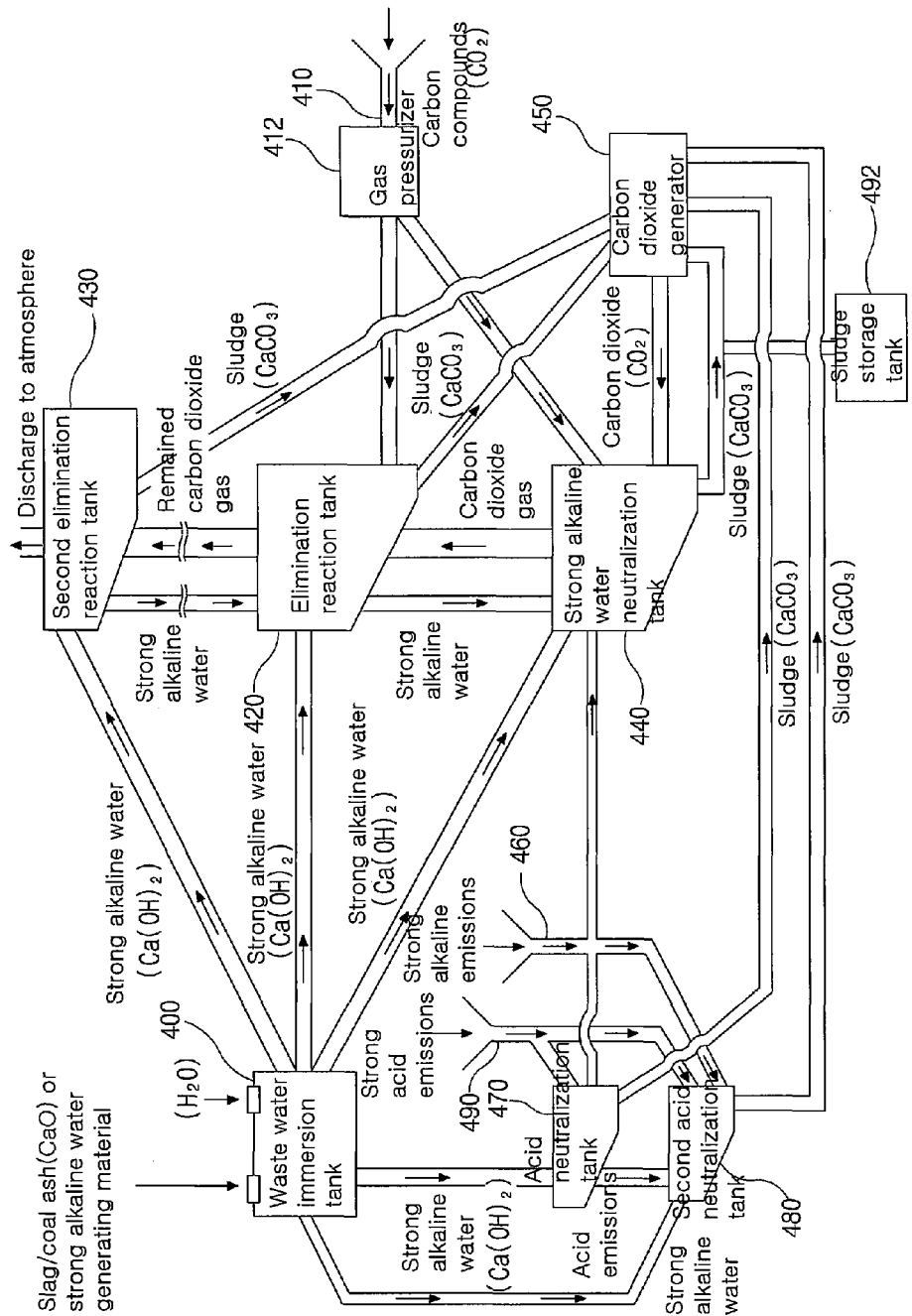
FIG. 8 is a schematic view showing a system for reducing environmental pollutants in accordance with an eighth exemplary embodiment of the present invention.

Meanwhile, FIG. 8 is a schematic view showing a system for reducing environmental pollutants in accordance with an eighth exemplary embodiment of the present invention, which may be used in a steel mill.

As shown in FIG. 8, the system for reducing environmental pollutants in accordance with an eighth exemplary embodiment of the present invention may further include a strong acid supply pipe 490 for supplying strong acid emissions, which are to be eliminated, introduced from the exterior, and an acid neutralization tank 470 for neutralizing the strong acid emissions supplied through the strong acid supply pipe 490 using strong alkaline elements.

The strong acid supply pipe 490 collects strong acid emissions generated in industrial fields such as a steel mill, thermoelectric power plants, cement production plants, and so on, to supply the emissions into the acid neutralization tank 470. The strong acid emissions are generally in a liquid phase.

The acid neutralization tank 470 neutralizes the strong acid emissions supplied through the strong acid supply pipe 490 using the strong alkaline elements supplied through the waste water immersion tank 400 or the strong alkali supply pipe 460 to make the strong acid emissions harmless.

The acid neutralization tank 470 may include a contact rate improving means for increasing a contact level between the strong acid element and the strong alkaline element to improve reaction efficiency.

In addition, a second acid neutralization tank 480 may be provided to additionally neutralize the strong acid element primarily neutralized in the acid neutralization tank 470.

The second acid neutralization tank 480 receives and contains the primarily neutralized strong acid element from the acid neutralization tank 470, and additionally receives a small amount of strong alkaline element from the waste water immersion tank 400 or the strong alkali supply pipe 460, more completely neutralizing the strong acid element.

Here, the second acid neutralization tank 480 may additionally receive a small amount of strong acid element from the strong acid supply pipe 490. That is, the second acid neutralization tank 480 may selectively receive the strong acid element and the strong alkaline element to adjust a pH level to a desired level by measuring a pH value.

Meanwhile, unlike the above, the strong acid emissions supplied through the strong acid supply pipe 490 may be supplied to the acid neutralization tank 470 when the pH of the strong acid emissions is high, or may be supplied to the second acid neutralization tank 480 when the pH is low.

The second acid neutralization tank 480 may also include a contact rate improving means for improving reaction efficiency, or may be controlled under a specific atmospheric condition.

The calcium carbonate sludge is generated in the acid neutralization tank 470 and the second acid neutralization tank 480 as the neutralization reaction is performed, and the generated calcium carbonate sludge is supplied into the carbon dioxide generator 450 to be used to generate carbon dioxide, discharging the separated neutralization water to the exterior.

However, when an amount of the calcium carbonate sludge generated through the acid neutralization tank 470 and the second acid neutralization tank 480 is larger than an amount required generating carbon dioxide, excessive calcium carbonate sludge may be separately collected to be stored in the sludge storage tank 492 in a dried state.

Of course, excessive calcium carbonate sludge generated in the elimination reaction tank 420, the second elimination reaction tank 430 and the strong alkaline water neutralization tank 440 may also be collected to be stored in the sludge storage tank 492, and the calcium carbonate accumulated in the sludge storage tank 492 may be usefully reused as a raw material for fertilizer or smelting in a steel mill.

Figure 9:
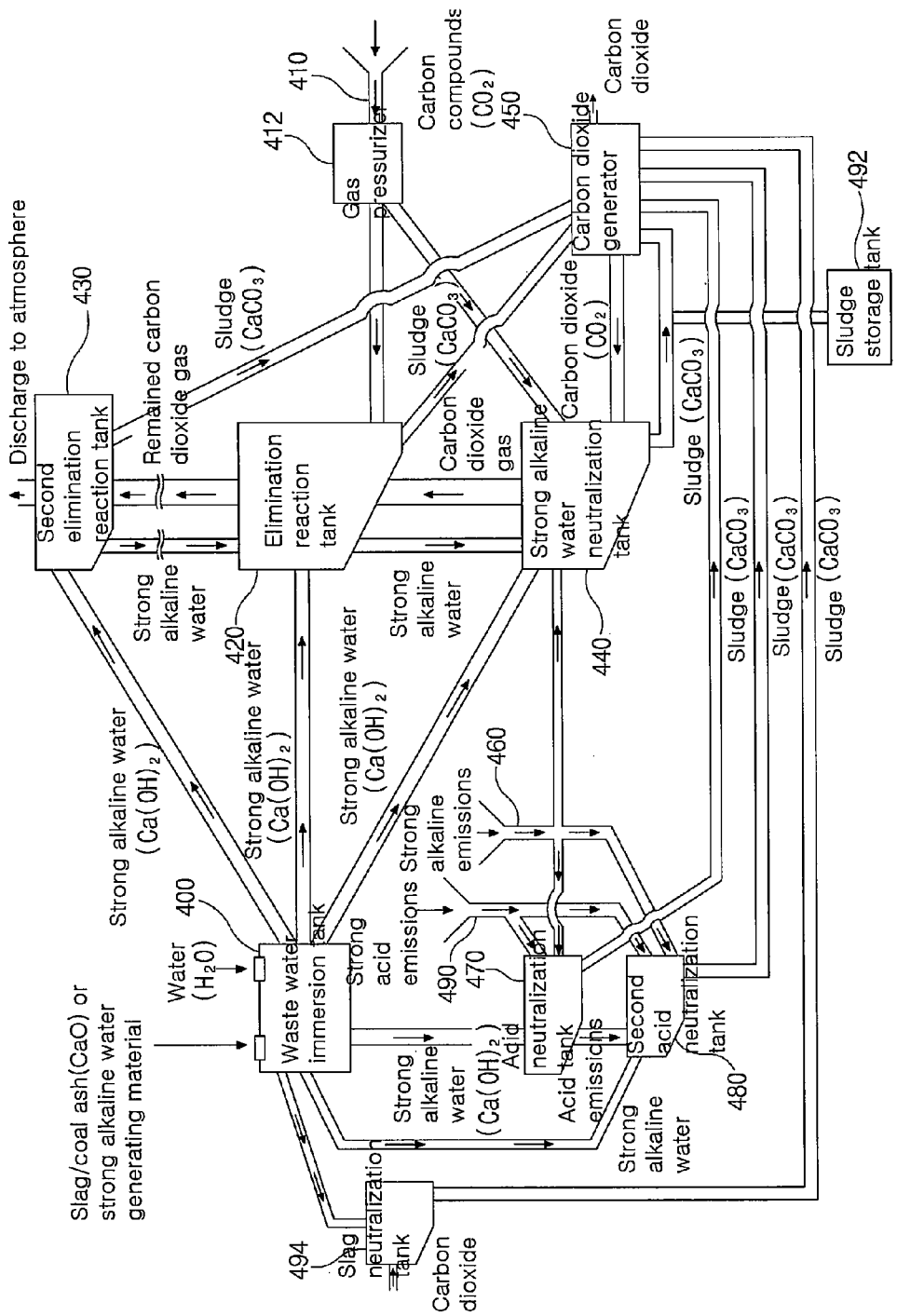
FIG. 9 is a schematic view showing a system for reducing environmental pollutants in accordance with a ninth exemplary embodiment of the present invention.

Meanwhile, FIG. 9 is a schematic view showing a system for reducing environmental pollutants in accordance with a ninth exemplary embodiment of the present invention, which may be used in a steel mill.

As shown in FIG. 9, the system for reducing environmental pollutants in accordance with a ninth exemplary embodiment of the present invention may further include a slag neutralization tank 494 for neutralizing slag aggregate supplied from the waste water immersion tank 400.

The slag neutralization tank 494 neutralizes the slag aggregate supplied from the waste water immersion tank 400 using carbon dioxide. Specifically, when the slag aggregate in the waste water immersion tank 400 is supplied into the slag neutralization tank 494 through a conveyor belt, and so on, since the supplied slag aggregate reacts with water contained in the slag neutralization tank 494 to generate strong alkaline water, the strong alkaline water is neutralized using carbon dioxide to neutralize the slag aggregate.

That is, when the slag aggregate is used as a material for construction or aggregate for civil engineering in a state in which the slag aggregate is not completely neutralized, the slag aggregate may contact groundwater, rainwater, etc., and generate alkaline leachate, contaminating rivers or seawater, and hygroscopic expansion may cause structural damage. In order to prevent the environmental pollution or the structural damage, the slag aggregate must be perfectly neutralized in the slag neutralization tank 494.

The slag neutralization tank 494 may receive carbon dioxide from the carbon dioxide generator 450 installed at a side of the strong alkaline water neutralization tank 440 or a separately-provided carbon dioxide generator (not shown).

Of course, the slag neutralization tank 494 may receive carbonated water from a carbonated water manufacturing device to improve reaction efficiency, instead of carbon dioxide.

The calcium carbonate sludge and neutralized water may be generated as a resultant material of the neutralization reaction in the slag neutralization tank 494, the generated calcium carbonate sludge may be supplied into the carbon dioxide generator 450 to be used to generate carbon dioxide, or separately collected to be stored in the sludge storage tank 492, and the separated neutralized water may be discharged to the exterior.

An impactor (not shown) may be installed in the slag neutralization tank 494 to apply impacts to the slag aggregate contained therein to more easily extract quicklime remained in the slag aggregate, maximally neutralizing the slag aggregate. The impactor is not limited as long as appropriate impact can be continuously applied to the slag aggregate. For example, the impactor may be implemented as a rotary pipe rotated in the tank.

While the slag neutralization tank 494 has been described as neutralizing the slag aggregate through a wet method using water, a dry method of directly injecting carbon dioxide gas to the slag aggregate at a high pressure may be used to neutralize the slag aggregate.

In addition, the system for reducing environmental pollutants in accordance with a ninth exemplary embodiment of the present invention can control a supply amount or a conveyance time of each element using an opening/closing means (not shown) such as a valve when each element is supplied or conveyed. In addition, a flow path selection means (not shown) may be appropriately used to change a conveyance path of each element.

Further, pH measuring means (not shown) may be provided at required positions to measure a pH of each element to determine a supply time and supply amount of each element. For example, a pH in the acid neutralization tank 170 is measured by the pH measuring means installed in the acid neutralization tank 470 so that a strong acid element can be supplied into the second acid neutralization tank 480 when it is checked that the element is neutralized to about a target level.

Figure 10:
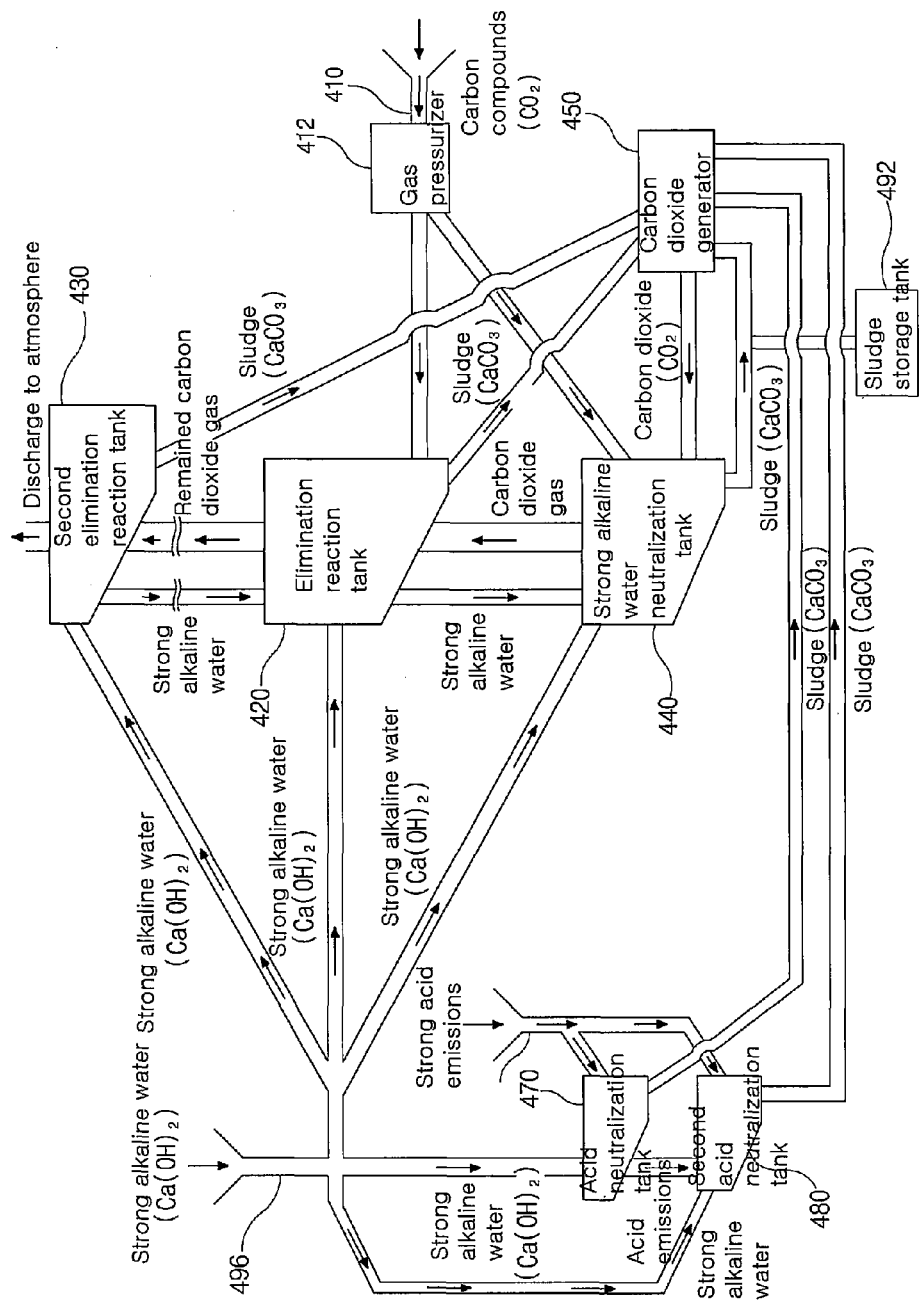
FIG. 10 is a schematic view showing a system for reducing environmental pollutants in accordance with a tenth exemplary embodiment of the present invention.

Furthermore, while it has been described that the strong alkaline water is generated through the waste water immersion tank 400 to be supplied into the elimination reaction tanks 420 and 430 and the acid neutralization tanks 470 and 480, when an amount of usable slag is insufficient to make a necessary amount of strong alkaline water using the slag, as shown in FIG. 10, the strong alkaline water may be made through various methods to be supplied through a strong alkaline water supply pipe 496.

FIG. 10 is a schematic view showing a system for reducing environmental pollutants in accordance with a tenth exemplary embodiment of the present invention, which may be used in a steel mill.

As shown in FIG. 10, the system for reducing environmental pollutants in accordance with a tenth exemplary embodiment of the present invention may heat calcium carbonate stored in a sludge storage tank 492 to about 900° C. to extract calcium oxide (CaO) and cause the calcium oxide to react with water to generate strong alkaline water, or directly generate strong alkaline water using a strong alkaline element such as calcium hydroxide, etc., to supply the strong alkaline water through a strong alkaline water supply pipe 496.

According to the present invention, since a large amount of slag generated from a steel mill, and so on, can be reused to effectively reduce carbon dioxide, one of greenhouse gases, a major cause of destruction of the ozone layer, global warming and the greenhouse effect, it is very economical and it is possible to actively deal with carbon emission regulations, which are gradually being tightened.

In addition, since strong acid emissions and strong alkali emissions, which are water pollutants generated in industrial fields, as well as carbon dioxide, which is an air pollutant, can be neutralized together, it is possible to provide excellent industrial usability and applicability.

Further, it is possible to obtain useful byproducts such as calcium carbonate, and neutralized slag aggregate, that can be used as industrial raw materials or construction aggregates.

Furthermore, the system for reducing environmental pollutants in accordance with the present invention may be installed a single plant such as a steel mill to treat carbon dioxide, slag, strong alkali emissions and strong acid emissions in combination. Moreover, the system may be installed between a steel mill, which mainly discharges slag and carbon dioxide, and a chemical plant, which mainly discharges strong alkali emissions and strong acid emissions, to provide combined treatment. In addition, the system may be installed at a separate waste disposal company to collect and treat industrial wastes such as slag, strong alkali emissions and strong acid emissions to eliminate carbon dioxide gas generated from neighboring factories.

Here, the strong alkali and strong acid disclosed herein are intended to include alkalescence and weak acid.

While the system for reducing environmental pollutants in accordance with an exemplary embodiment of the present invention has been described as eliminating carbon compounds such as carbon dioxide generated during a process or contained in an exhaust gas discharged form a caloric engine using slag or coal ash including quicklime from a steel mill or a cement factory, and simultaneously eliminating the quicklime in the slag or coal ash to neutralize the slag or coal ash, the quicklime from the steel mill or cement factory may be insufficiently neutralized through mere use for elimination of such carbon compounds. Therefore, in other embodiments, the slag including quicklime or coal ash or the coal ash can be neutralized to reduce the environmental pollutants generated from the steel mill or cement factory, and such a system can be installed with the system for reducing environmental pollutants to be complementarily operated.

Figure 11:
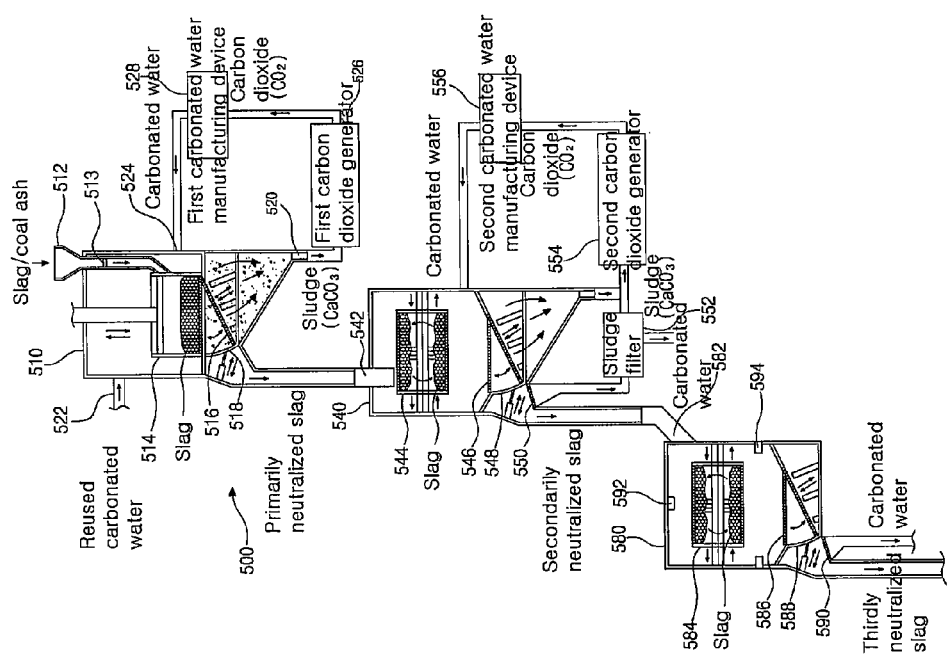
FIG. 11 is a schematic view showing a system for reducing environmental pollutants in accordance with an eleventh exemplary embodiment of the present invention.

FIG. 11 is a schematic view showing a system for reducing environmental pollutants according to the eleventh embodiment of the present invention. The system for reducing environmental pollutants neutralizes industrial wastes, i.e., slag, produced in bulk from various industrial fields, such as a steel manufacturing process, a cement manufacturing process or the like, with carbonated water.

As shown in FIG. 11, the system for reducing environmental pollutants 500 according to the eleventh embodiment of the present invention includes a first neutralization treatment unit 510, a second neutralization treatment unit 540, and a third neutralization treatment unit 580. In the system for reducing environmental pollutants 500, after the slag itself is introduced into a reaction tank filled with water in which carbon dioxide is fully saturated (carbonated water), shock such as vibration is continuously applied to the slag in the reaction tank to extract calcium oxide or the like contained in the slag. The extracted calcium oxide is reacted with the water filled in the reaction tank, which produces calcium hydroxide ($Ca(OH)_2$). The produced calcium hydroxide ($Ca(OH)_2$) is neutralized by carbon dioxide contained in the carbonated water of the reaction tank.

The first, second and third neutralization treatment units 510, 540 and 580 are units for extracting and neutralizing the calcium oxide existing in the slag, and are not limited to the above configuration, but should be able to effectively extract the calcium oxide existing in the slag.

The system for reducing environmental pollutants 500 shown in FIG. 11 is applied with a wet neutralization method of neutralizing the slag with the carbonated water in which the carbon dioxide is saturated, but a dry neutralization method can be applied to systems for reducing environmental pollutants according to other embodiments, in which carbon dioxide gas is ejected onto the slag at high pressure and the calcium oxide of the slag is directly reacted with the carbon dioxide to neutralize the slag.

More specifically, the first neutralization treatment unit 510 includes a slag inlet pipe 512, a slag impactor 514, first and second slag dischargers 516 and 518, a sludge valve 520, a carbonated water inlet pipe 524, and a recycled carbonated water inlet pipe 522.

The slag inlet pipe 512 is a passage through which the slag is introduced into the first neutralization treatment unit 510. In this instance, the slag can be supplied into the first neutralization treatment unit 510 by a conveyor belt or the like. The slag inlet pipe 512 can further have opening/closing means 513, and can control the amount of the slag to be introduced according to manipulation of the opening/closing means 513.

The slag introduced into the first neutralization treatment unit 510 is conveyed to the slag impactor 514. The slag impactor 514 is placed in the carbonated water, and applies desired impact to the slag to extract impurities, such as calcium oxide, contained in the slag. In this instance, the calcium oxide extracted from the slag is reacted with the surrounding water to produce calcium hydroxide ($Ca(OH)_2$). The produced calcium hydroxide ($Ca(OH)_2$) is neutralized by carbon dioxide saturated in the carbonated water. To this end, the wall surface or bottom surface of the slag impactor 514 can be made of a porous plate so that the surrounding carbonated water can flow in or out.

The intensity or magnitude of the impact applied to the slag by the slag impactor 514 can be appropriately adjusted depending upon the volume, weight or shape of the slag.

The slag is primarily neutralized by applying the given impact to the slag by the slag impactor 514 to extract the impurities such as calcium oxide, and then is discharged outwardly by the first and second slag dischargers 516 and 518.

The first slag discharger 516 is provided at the bottom surface of the slag impactor 514, and is opened and closed in a downward direction. If the first slag discharger 516 is opened in the downward direction, the slag is slid downwardly along the incline of the first slag discharger 516.

The second slag discharger 518 is placed at an outlet portion of the first slag discharger 516 from which the slag is slid and discharged when the first slag discharger 516 is opened in the downward direction. When the slag is discharged, the second slag discharger 518 is opened, so that the slag is discharged to the second neutralization treatment unit 540 which is placed outside or below the first neutralization treatment unit.

When the second slag discharger 518 is opened, the carbonated water can be discharged together with the slag. The discharged carbonated water is collected and returned to the first neutralization treatment unit via the recycled carbonated water inlet pipe 522. However, the second slag discharger 518 may be closed immediately when the slag is discharged, thereby maximally reducing the discharge of the carbonated water.

Meanwhile, in the process of neutralizing the calcium oxide, which is extracted from the slag by the slag impactor 514, with the carbonated water, calcium carbonate ($CaCO_3$) can be produced in a sludge type.

The produced sludge is deposited at the bottom portion of the first neutralization treatment unit 510 due to its weight. The deposited sludge can be collected by the sludge valve 520.

Since the first neutralization treatment unit 510 utilizes the carbon dioxide contained in the carbonated water, reaction conditions may be set so as to easily extract the carbon dioxide from the carbonated water. For example, the neutralization treatment unit 510 is maintained at a relatively low temperature so as to raise the saturation of carbon dioxide, and the concentration of the carbon dioxide in the carbonated water may be increased.

Meanwhile, since the first neutralization treatment unit 510 neutralizes the slag with the carbonated water containing the carbon dioxide in a supersaturated state, the first neutralization treatment unit 510 may further include a first carbon dioxide generator 526 and a carbonated water producer 528 in order to supply the carbonated water to the first neutralization treatment unit.

The carbon dioxide generator 526 is not specifically limited as long as it can generate a sufficient amount of carbon dioxide for the first neutralization treatment unit 510. For example, an apparatus capable of producing carbon dioxide by adding an acid solution to the sludge discharged from the first neutralization treatment unit 510 can be used. In addition, the carbon dioxide generator 526 can receive and use the carbon dioxide from a carbon dioxide collector (not shown) which collects a carbon-based compound, such as carbon dioxide, discharged from a factory in which a steel manufacturing process is performed.

As long as the carbonated water producer 528 can dissolve the carbon dioxide, which is generated by the carbon dioxide generator 526, in water to produce and supply carbonated water to the first neutralization treatment unit 510, it is not specifically limited.

Although FIG. 11 shows the direct inflow of the carbonated water into the first neutralization treatment unit 510, other embodiments may be configured to directly introduce the carbon dioxide generated by the carbon dioxide generator 526 into the first neutralization treatment unit 510 so that the carbonated water is produced in the first neutralization treatment unit 510.

Next, the second neutralization treatment unit 540 includes a slag inlet pipe 542, a rotary slag impactor 544, third and fourth slag dischargers 546 and 548, and a carbonated water collecting plate 550.

The slag inlet pipe 542 is a passage through which the slag is introduced into the second neutralization treatment unit 540 from the first neutralization treatment unit 510. In this instance, the slag inlet pipe 542 can introduce the carbonated water together with the slag into the second neutralization treatment unit 540 from the first neutralization treatment unit 510. The slag inlet pipe 542 can further have opening/closing means (not shown), and can control the amount of the slag to be introduced according to manipulation of the opening/closing means.

The slag introduced into the second neutralization treatment unit 540 is conveyed to the rotary slag impactor 544. The rotary slag impactor 544 is placed in the carbonated water, and rotates the introduced slag and applies desired impact to the slag to extract impurities, such as calcium oxide, contained in the slag. The rotary slag impactor 544 is not limited to a method of applying the impact to the slag, but, as shown in FIG. 11, can be configured to apply the impact to the slag, which is put in a rotary tank provided in the rotary slag impactor 544, by rotating and moving the rotary tank in a left and right direction so that the slag collides with the rotary tank. In addition, the rotary tank may be provided with an inlet port (not shown), through which the slag is introduced, and an outlet port (not shown), through which the slag is discharged. In this instance, the calcium oxide extracted from the slag is reacted with the surrounding water to produce calcium hydroxide ($Ca(OH)_2$). The produced calcium hydroxide ($Ca(OH)_2$) is neutralized by the carbon dioxide saturated in the carbonated water. To this end, the wall surface or bottom surface of the rotary slag impactor 544 can be made of a porous plate so that the surrounding carbonated water can flow in or out.

The slag, from which the impurities such as calcium oxide are, extracted by applying the desired impact to the slag by the rotary slag impactor 544, is discharged outwardly by the third and fourth slag dischargers 546 and 548. Since the configurations of the third and fourth slag dischargers 546 and 548 are substantially similar to those of the first and second slag dischargers 516 and 518, the detailed description thereof will be omitted herein.

The carbonated water recollecting plate 550 is placed adjacent to the second slag discharger 548, and is installed to have a gentle incline in a horizontal direction. The carbonated water recollecting plate 550 is made of a porous plate so that the carbonated water flows therethrough. More specifically, if the second slag discharger 548 is opened, the slag is discharged. The discharged slag is slowly moved in a downward direction by the carbonated water recollecting plate 550 which is installed at the gentle incline. Then, the carbonated water discharged together with the slag is discharged through the holes formed in the carbonated water recollecting plate 550, and thus only the slag is discharged outwardly or to the third neutralization treatment unit 580. The carbonated water discharged downwardly through the holes of the carbonated water recollecting plate 550 is collected and introduced into the first neutralization treatment unit 510.

Meanwhile, the second neutralization treatment unit 540 may further include a carbon dioxide generator 554 and a carbonated water producer 556 in order to supply the carbonated water. The configurations of the carbon dioxide generator 554 and the carbonated water producer 556 are substantially similar to those of the carbon dioxide generator 526 and the carbonated water producer 528 which are connected to the first neutralization treatment unit 510, and thus the detailed description thereof will be omitted herein.

In addition, the second neutralization treatment unit 540 may further include a sludge filter 550 for collecting and recycling the carbonated water discharged downwardly through the holes of the carbonated water recollecting plate 550. The sludge filter 552 filters the sludge contained in the carbonated water so that only the carbonated water is introduced into the first neutralization treatment unit 510. In this instance, the filtered sludge can be conveyed to the carbon dioxide generator 554 and thus used to generate the carbon dioxide.

The third neutralization treatment unit 580 includes a slag inlet pipe 582, a rotary slag impactor 584, fifth and sixth slag dischargers 586 and 588, a carbonated water collecting plate 590, and pH measuring sensors 592 and 594.

The slag inlet pipe 582 is a passage through which the slag is introduced into the third neutralization treatment unit 580 from the second neutralization treatment unit 540. In this instance, the slag inlet pipe 582 can introduce the carbonated water together with the slag into the third neutralization treatment unit 580 from the second neutralization treatment unit 540. The slag inlet pipe 582 can further have opening/closing means (not shown), and can control the amount of the slag to be introduced according to manipulation of the opening/closing means.

The slag introduced into the third neutralization treatment unit 580 is conveyed to the rotary slag impactor 584. The rotary slag impactor 584 is placed in the carbonated water in which the carbon dioxide is saturated, and applies desired impact to the slag to extract impurities, such as calcium oxide, contained in the slag. The configuration and operation of the rotary slag impactor 584 is substantially identical to that of the rotary slag impactor 544 of the second neutralization treatment unit 540, and thus the detailed description thereof will be omitted herein.

The slag, from which the impurities such as calcium oxide are extracted by applying the desired impact to the slag by the rotary slag impactor 58, is discharged outwardly by the fifth and sixth slag dischargers 586 and 588. Since the configurations of the fifth and sixth slag dischargers 586 and 588 are substantially similar to those of the first and second slag dischargers 516 and 518, the detailed description thereof will be omitted herein.

The carbonated water recollecting plate 590 is placed adjacent to the sixth slag discharger 588, and is installed to have a gentle incline in a horizontal direction. The carbonated water recollecting plate 588 is made of a porous plate so that the carbonated water flows therethrough. More specifically, if the sixth slag discharger 588 is opened, the slag is discharged. The discharged slag is slowly moved in a downward direction by the carbonated water recollecting plate 590 which is installed at the gentle incline. Then, the carbonated water discharged together with the slag is discharged through the holes formed in the carbonated water recollecting plate 590, and thus only the slag is discharged outwardly. Therefore, only the slag is discharged outwardly.

The carbonated water discharged downwardly through the holes of the carbonated water recollecting plate 590 is collected via the sludge filter, and then is introduced into the first neutralization treatment unit 510.

Meanwhile, the third neutralization treatment unit 580 neutralizes the slag with the carbonated water containing the carbon dioxide in a supersaturated state, and may further include a carbon dioxide generator (not shown) and a carbonated water producer (not shown) in order to supply the carbonated water to the third neutralization treatment unit 580.

The pH measuring sensor 594 measures pH of the third neutralization treatment unit 580. In this instance, in a case where the pH does not reach a target level, the rotary slag impactor 584 is operated to continuously neutralize the slag until the pH reaches the target level.

The pH is appropriately set depending upon the purpose, but may be set in the range of 7.5 to 8. In a case where the pH is 7 or less, calcium bicarbonate is produced by reaction of calcium hydroxide ($Ca(OH)_2$) and carbon dioxide, and thus the efficiency of the neutralization reaction can be decreased.

The configuration capable of treating the sludge, such as the first neutralization treatment unit 510 and the second neutralization treatment unit 540, may be further provided so as to treat the sludge produced from the third neutralization treatment unit 580.

The system for reducing environmental pollutants 500 is configured to include three neutralization units including the first to third neutralization treatment units 510, 540 and 580, but this embodiment is not limited in the number of the neutralization treatment units. It is obvious to those skilled in the art that the first to third neutralization treatment units 510, 540 and 580 can be appropriately disposed in accordance to a target neutralization degree of the slag.

In addition, the system for reducing environmental pollutants 500 uses the first to third neutralization treatment units 510, 540 and 580 to which the wet neutralization method is applied, but a neutralization treatment unit (not shown), to which a dry neutralization method of neutralizing slag aggregate by directly contacting carbon dioxide with the slag aggregate is applied, may be added to other embodiments. For example, the slag neutralization tank 494 in FIG. 9 may be configured as the system for reducing environmental pollutants 500 in FIG. 11.

As described above, since the system for reducing environmental pollutants according to the eleventh embodiment of the present invention neutralizes the slag itself, even when the slag is used as building materials or the like, alkaline leachate is not produced, which can prevent a problem of environmental pollution caused by alkaline leachate. Accordingly, the neutralized slag can be used as building materials at building sites, such as general sand or crushed stone. In addition, the system for reducing environmental pollutants can be modified and utilized for purposes of neutralizing sea sand or alkaline aggregate, as well as the slag neutralization.

Furthermore, the system for reducing environmental pollutants can be installed with the systems for reducing environmental pollutants according to the first to eleventh embodiments of the present invention, and be utilized to neutralize the slag which is not used to remove carbon compounds such as carbon dioxide.

Meanwhile, the system for reducing environmental pollutants according to the eleventh embodiment of the present invention neutralizes the slag using the carbonated water saturated with carbon dioxide, but can neutralize leachate discharged from the slag containing calcium oxide to reduce environmental pollutants in other embodiments. That is, the system for reducing environmental pollutants neutralizes the alkaline leachate by treatment of carbon dioxide, and the calcium carbonate produced at the time can be used again to produce the carbon dioxide.

Figure 12:
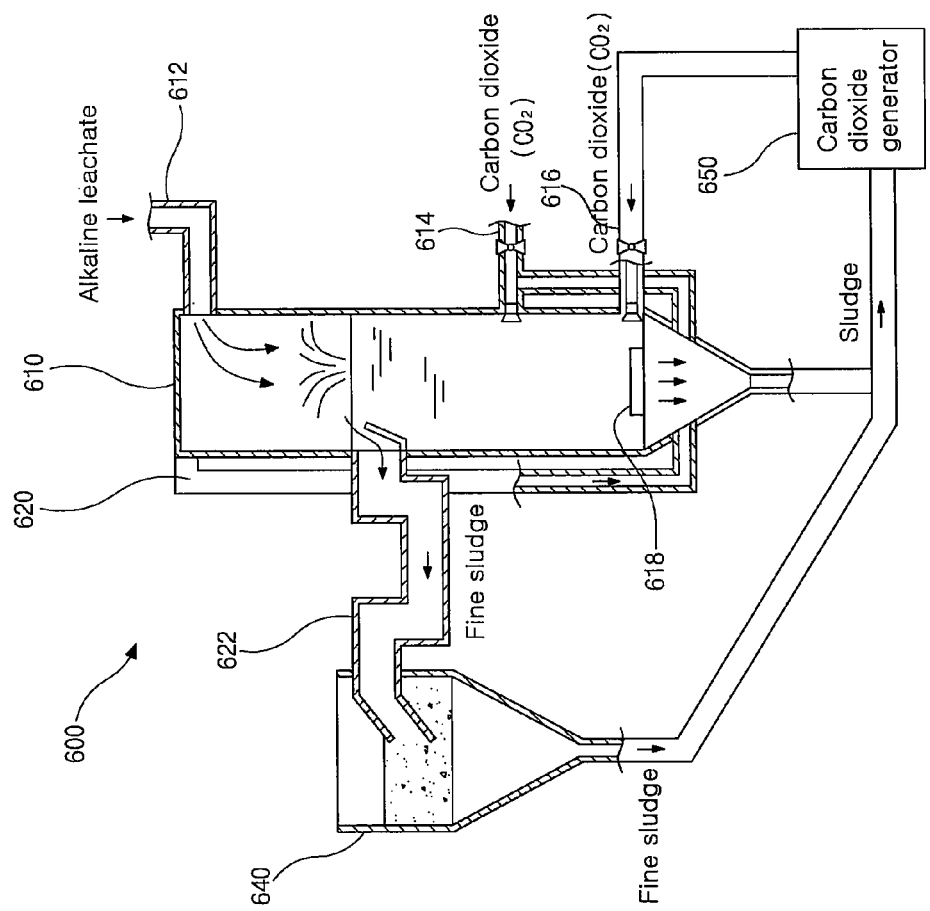
FIG. 12 is a schematic view showing a system for reducing environmental pollutants in accordance with a twelfth exemplary embodiment of the present invention.

FIG. 12 shows a schematic view showing a system for reducing environmental pollutants according to the twelfth embodiment of the present invention.

As shown in FIG. 12, the system for reducing environmental pollutants 600 according to the twelfth embodiment includes a neutralization treatment tank 610, a fine-sludge treatment tank 640, and a carbon dioxide generator 650.

The neutralization treatment tank 610 supplies carbon dioxide to alkaline leachate, which is introduced via an inlet portion 612, from first and second carbon dioxide supply units 614 and 616 to react the alkaline leachate with the carbon dioxide. To this end, the inlet portion 612 is provided at the upper end of the neutralization treatment tank 610, so that the inflow alkaline leachate falls from a high elevation in an atmosphere containing excess carbon dioxide, thereby increasing a contact area of the alkaline leachate and the carbon dioxide. The neutralization treatment tank 610 may be made of a material having chemical resistance which is stable to alkali.

Accordingly, it is preferable to supply the excess carbon dioxide to the neutralization treatment tank 610, and the carbon dioxide which is not reacted in the process is recycled by a recirculation pipe 620. The recirculation pipe 620 is connected to the upper end of the neutralization treatment tank 610 to collect the excess carbon dioxide and supply it to the lower end of the neutralization treatment tank 610. The recycled carbon dioxide is supplied to the neutralization treatment tank 610 again via a carbon dioxide supply unit 614, thereby increasing the use efficiency of the carbon dioxide.

The neutralization treatment tank 610 may further include an aeration tank 618 therein, in which aeration is caused by the aeration tank 618 to increase the reaction area of the carbon dioxide and the alkaline leachate and thus promote the reaction of the carbon dioxide and the alkaline leachate.

The neutralization reaction of the alkaline leachate and the carbon dioxide is performed in the neutralization treatment tank 610 to produce the calcium carbonate ($CaCO_3$) in a sludge type.

The produced calcium carbonate sludge is deposited at the lower portion of the neutralization treatment tank 610, and then is collected and supplied to the carbon dioxide generator 650. To this end, the lower portion of the neutralization treatment tank 610 may be provided with a filter (not shown). The filter is not specifically limited as long as it can discharge neutralization water and filter the calcium carbonate sludge.

In addition, when the alkaline leachate flowing in the neutralization treatment tank 610 falls, the alkaline leachate can be reacted with carbon dioxide in the atmosphere to produce fine calcium carbonate sludge. The produced fine sludge is supplied to the fine-sludge treatment tank 640 via a discharge unit 622 of the neutralization treatment tank 610. To this end, the discharge unit 622 may be provided with a suction device for suctioning the fine sludge.

The fine-sludge treatment tank 640 receiving the fine calcium carbonate sludge collects and supplies the fine sludge to the carbon dioxide generator 650.

According to the twelfth embodiment of the present invention, the carbon dioxide produced by the carbon dioxide generator 650 is directly supplied to the neutralization treatment tank 610 to neutralize the alkaline leachate of the neutralization treatment tank 610 into carbon dioxide. According to other embodiments similar to the eleventh embodiment, a carbonated water generating unit may be further provided between the carbon dioxide generator 650 and the neutralization treatment tank 610. That is, the carbonated water generating unit mixes the carbon dioxide produced by the carbon dioxide generator 650 with the water to produce and supply the carbonated water to the neutralization treatment tank 610, thereby neutralizing the alkaline leachate with the carbonated water. In this instance, the carbonated water generating unit may apply desired pressure to the carbon dioxide to saturate the carbon dioxide at 100%, and maintain the carbon dioxide at a low temperature to easily saturate the carbon dioxide and thereby produce the carbonated water.

Figure 13:
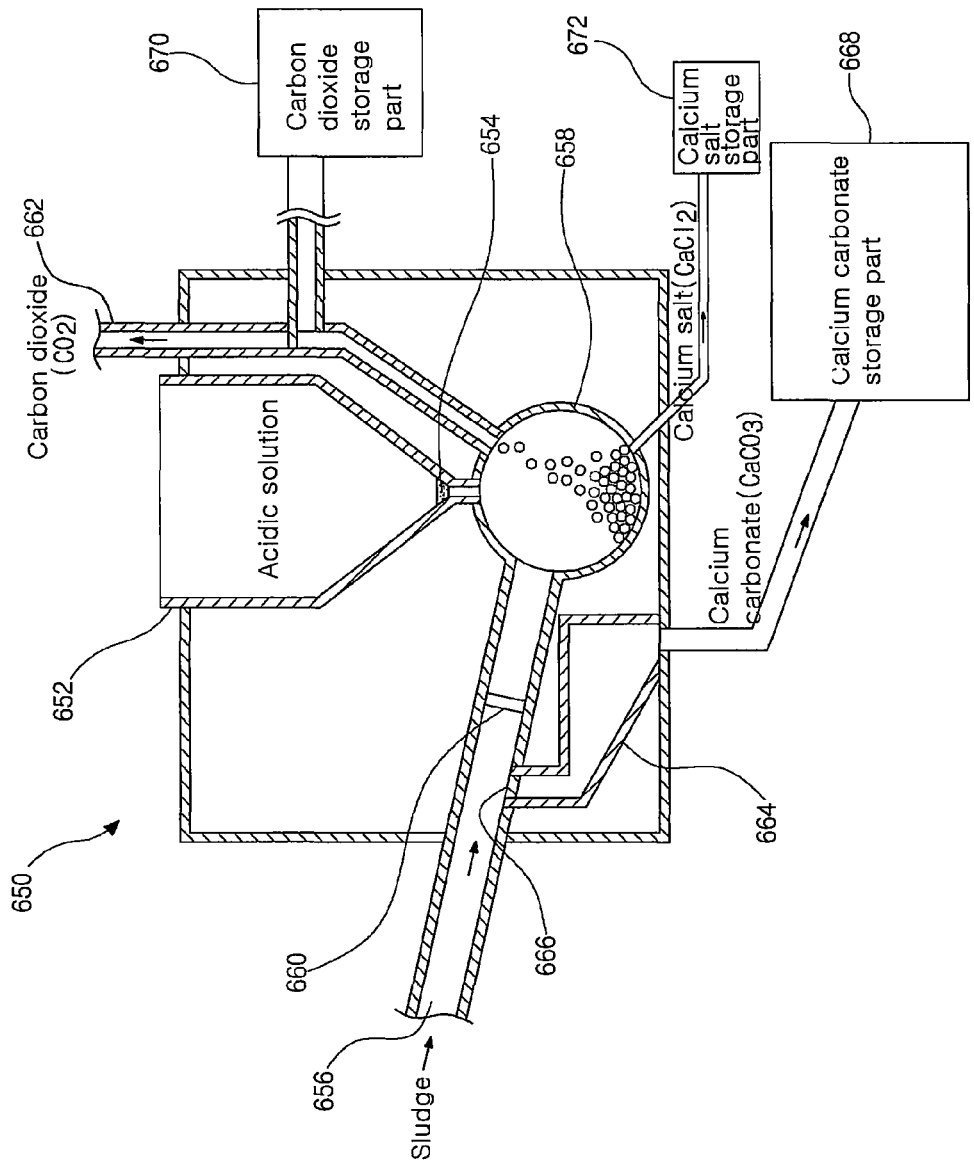
FIG. 13 is a schematic view showing a carbon dioxide generator of the system for reducing environmental pollutants in accordance with a twelfth exemplary embodiment of the present invention.

FIG. 13 is a schematic view showing the carbon dioxide generator for the system for reducing environmental pollutants according to the twelfth embodiment of the present invention.

As shown in FIG. 13, the carbon dioxide generator 650 includes an acid liquid storage unit 652, a carbon dioxide generating unit 658, a calcium carbonate drying unit 664, a calcium carbonate storage unit 666, and a carbon dioxide storage unit 670.

In the carbon dioxide generator 650, an acid liquid stored in the acid liquid storage unit 652 is dropped on the calcium carbonate sludge supplied from the calcium carbonate sludge supply pipe 656 and conveyed to the carbon dioxide generating unit 658 to produce the carbon dioxide. The produced carbon dioxide is discharged to a carbon dioxide discharge pipe 662 or is stored in the carbon dioxide storage unit 670.

In addition, in a case where the generated amount of the carbon dioxide is sufficient, the calcium carbonate sludge supplied from the calcium carbonate sludge supply pipe 656 is dehydrated and dried in the calcium carbonate drying unit 664, and then is stored in the calcium carbonate storage unit 666.

The acid liquid storage unit 652 stores the acid liquid which can react with the calcium carbonate sludge to produce the carbon dioxide, and drops the acid liquid appropriately onto the carbon dioxide generating unit 658 in accordance with manipulation of an acid liquid dropping adjustment unit 654. The acid liquid stored and used in the acid liquid storage unit 652 is not specifically limited, and, for example, the acid liquid storage unit 652 may store hydrochloric acid, sulfuric acid, nitric acid or the like.

The calcium carbonate sludge supply pipe 656 supplies the calcium carbonate sludge to the carbon dioxide generating unit 658 or the calcium carbonate drying unit 664, and includes first and second opening/closing means 660 and 666. More specifically, in a case where the second opening/closing means 666 is closed and the first opening/closing means 660 is opened, the calcium carbonate sludge is supplied to the carbon dioxide generating unit 658. In a case where the first opening/closing means 660 is closed and the second opening/closing means 666 is opened, the calcium carbonate sludge is supplied to the calcium carbonate drying unit 664. The operation of the first and second opening/closing means 660 and 666 can be controlled depending upon the amount of the carbon dioxide to be supplied to the neutralization treatment tank 610. For example, in a case where the amount of the carbon dioxide to be supplied to the neutralization treatment tank 610 is sufficient, the first opening/closing means 660 is closed, and the second opening/closing means 666 is opened, thereby supplying the calcium carbonate to the calcium carbonate drying unit 664. In a case where the amount of the carbon dioxide to be supplied to the neutralization treatment tank 610 is not sufficient, the first opening/closing means 660 is opened, and the second opening/closing means 666 is closed, thereby supplying the calcium carbonate to the carbon dioxide generating unit 658 to produce additional carbon dioxide.

The carbon dioxide generating unit 658 is configured to communicate with the calcium carbonate sludge supply pipe 656 and the acid liquid storage unit 652, and the supplied calcium carbonate sludge and the supplied acid liquid are reacted with each other to produce the carbon dioxide.

In this instance, calcium salt produced by the reaction result is deposited at the lower portion of the carbon dioxide generating unit 658, and the produced carbon dioxide is discharged to the carbon dioxide discharge pipe 662 or is stored in the carbon dioxide storage unit 670.

The storage of the carbon dioxide in the carbon dioxide storage unit 670 is controlled depending upon the amount of the carbon dioxide supplied to the neutralization treatment tank 610. For example, in a case where the amount of the carbon dioxide to be supplied to the neutralization treatment tank 610 is sufficient, the carbon dioxide is compressively stored in the carbon dioxide storage unit 670. In a case where the amount of the carbon dioxide to be supplied to the neutralization treatment tank 610 is not sufficient, the carbon dioxide stored in the carbon dioxide storage unit 670 is additionally supplied to the neutralization treatment tank 610.

Meanwhile, the calcium salt produced by the carbon dioxide generating unit 658 is separately collected by a calcium salt storage tank 672.

The reaction of the calcium carbonate sludge and the acid liquid in the carbon dioxide generating unit 658 is as follows, for example, in a case where the acid liquid is hydrochloric acid:

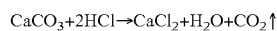

$$CaCO_3 + 2HCl \rightarrow CaCl_2 + H_2O + CO_2\uparrow$$

The kind of the calcium salt produced is different in accordance with the kind of the acid liquid used. For example, in a case where hydrochloric acid is used, the produced calcium salt is calcium chloride. In a case where sulfuric acid is used, the produced calcium salt is calcium sulfate. In a case where nitric acid is, the produced calcium salt is calcium nitrate.

The calcium carbonate drying unit 664 is configured to communicate with the calcium carbonate sludge supply pipe 656, and dehydrates and dries the introduced calcium carbonate to convey the dried calcium carbonate to the calcium carbonate storage unit 666 for storage. The stored calcium carbonate is conveyed to the carbon dioxide generating unit 658 to produce the carbon dioxide, or can be used as a raw material of fertilizer or iron and steel smelting. In addition, the stored calcium carbonate can be heated and converted into calcium oxide.

The carbon dioxide storage unit 670 compresses and stores the carbon dioxide which is produced in a case where the amount of the carbon dioxide flowing in the neutralization treatment tank 610 is sufficient.

Although the carbon dioxide generator 650 is used in the system for reducing environmental pollutants for neutralizing the alkaline leachate in the twelfth embodiment of the present invention, the carbon dioxide generator in FIG. 12 can be used in various systems for reducing environmental pollutants which neutralize the alkaline material using the carbon dioxide and produce the calcium carbonate as a byproduct in other embodiments. For example, the carbon dioxide generator according to the twelfth embodiment can be applied to the systems for reducing environmental pollutants according to the first and seventh to eleventh embodiments.

The system for reducing environmental pollutants 600 according to the twelfth embodiment of the present invention can recycle the calcium carbonate as a byproduct by neutralizing the alkaline leachate using the carbon dioxide, again producing the carbon dioxide using the produced calcium carbonate, and neutralizing the alkaline leachate using the produced carbon oxide. Accordingly, it is possible to significantly reduce the material for production of carbon dioxide, and to neutralize the alkaline leachate, which is produced by contact of the slag and the water, at a low cost and in a short time. In addition, calcium carbonate, or, if necessary, calcium oxide, calcium chloride, calcium sulfate, calcium nitrate or the like can be produced.

Meanwhile, in the systems for reducing environmental pollutants shown in FIGS. 6 to 10, after the slag produced at a steel mill or the like is converted into strong alkaline water, the neutralization process is performed by removing carbon compounds such as carbon dioxide using it. However, in the systems for reducing environmental pollutants according to other embodiments of the present invention, after the slag produced at the steel mill or the like is converted into the strong alkaline water, the neutralization process can be performed by causing the wasted acid to react with it.

Figure 14:
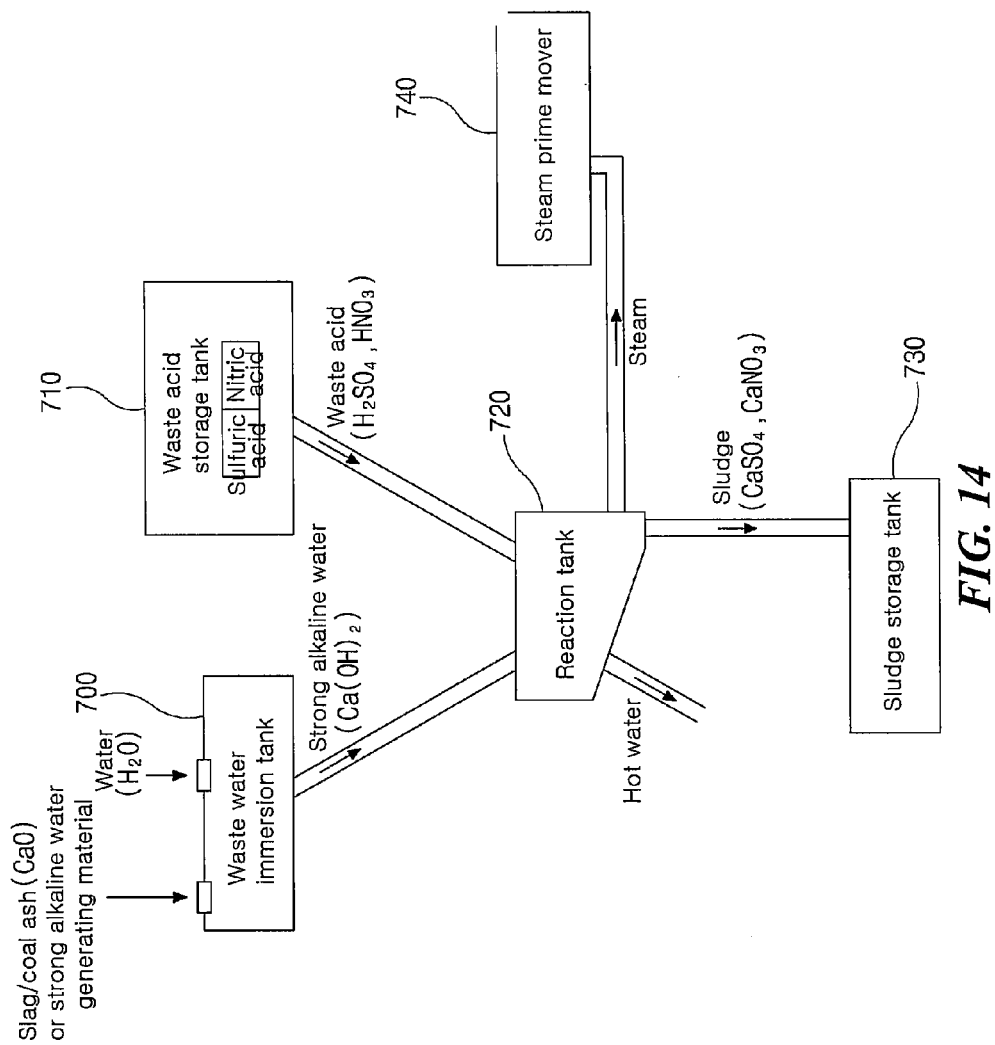
FIG. 14 is a schematic view showing a system for reducing environmental pollutants in accordance with a thirteenth exemplary embodiment of the present invention.

FIG. 14 is a schematic view showing a system for reducing environmental pollutants according to the thirteenth embodiment of the present invention which generates heat and steam using the chemical reaction between the wasted acid and the slag which is the industrial waste in bulk at various industrial sites such as a steel manufacturing process, a cement fabricating process or the like, and operating a steam engine using the produced steam.

As shown in FIG. 14, the system according to the thirteenth embodiment of the present invention includes a waste water soaking tank 700 which receives the slag and produces strong alkaline water of a calcium hydroxide ($Ca(OH)_2$) component by reacting the slag with the stored water, a wasted acid storage tank 710 which collects the wasted acid, and stores and supplies it, a reaction tank 720 which heats the stored water using high heat resulting from a chemical exothermic reaction between calcium carbonate and the wasted acid which are respectively supplied from the waste water soaking tank 700 and the wasted acid storage tank 710 to produce steam, and a steam motor 740 which is driven by the steam supplied from the reaction tank 720 to generate energy.

The waste water soaking tank 700 receives the slag or coal ash, which contains the calcium oxide provided and is collected at various industrial sites as impurities, from the exterior, and reacts the slag or coal ash with the stored water to produce the strong alkaline water of the calcium hydroxide component, or receives substances for producing the strong alkaline water, such as calcium hydroxide (Ca(OH)$_2$), sodium hydroxide (NaOH), potassium hydroxide (KOH) or the like, and reacts them with the stored water to produce the strong alkaline water.

That is, the slag is usually produced in the steel manufacturing process of manufacturing steel from iron ore. Since the slag is put with limestone in order to easily extract an iron component from the iron ore in the steel manufacturing process, the discharged slag contains calcium oxide (CaO) of a non-reaction state. Accordingly, the contained calcium oxide component is reacted with the water to produce the calcium carbonate according to the following reaction equation, and the calcium carbonate shows strong alkaline of pH 10 to 12 or more:

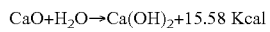

$$CaO + H_2O \rightarrow Ca(OH)_2 + 15.58 \text{ Kcal}$$

The calcium carbonate produced from the waste water soaking tank 700 is supplied to the reaction tank 720 using a transmitting pump (not shown).

In a case where the amount of the slag produced and collected at the industrial sites is not sufficient, the calcium oxide can be directly put into the waste water soaking tank 700 to produce strong alkaline water of calcium hydroxide.

The wasted acid storage tank 710 receives the wasted acid produced and collected at various industrial sites from the exterior, and stores and supplies it. The wasted acid may be sulfuric acid (H$_2$SO$_4$) or nitric acid (HNO$_3$).

The wasted acid storage tank 710 can store the wasted acids according to types, that is, store the sulfuric acid and the nitric acid separately, and supply the wasted acid.

The wasted acid stored in the wasted acid storage tank 710 is supplied to the reaction tank 720 by the transmitting pump (not shown) or the like.

Of course, as the calcium hydroxide and the wasted acid are respectively supplied from the waste water soaking tank 700 and the wasted acid storage tank 710 to the reaction tank 720, each of the supply pipes is provided with supply amount controlling means (not shown) to adjust its supply amount (i.e., transmitting amount).

The reaction tank 720 heats the stored water using the high heat resulting from the chemical exothermic reaction between the calcium hydroxide and the wasted acid which are respectively supplied from the waste water soaking tank 700 and the wasted acid storage tank 710 to generate the steam, and supplies the produced steam to the steam motor 740.

For example, in a case where the supplied wasted acid is sulfuric acid (H$_2$SO$_4$), the following chemical exothermic reaction occurs:

$$Ca(OH)_2 + H_2SO_4 \rightarrow CaSO_4 + 2H_2O + 47.53 \text{ Kcal}$$

That is, the high heat corresponding to 47.53 Kcal is produced by the reaction between the calcium hydroxide and the sulfuric acid, and the stored water is heated to 100° C. or more by the produced high heat, so that the water is converted into the steam of a high temperature.

In a case where the generated amount of high heat is further increased in the reaction tank 720 to increase the evaporative efficiency, a part of calcium oxide is directly put in the reaction tank 720, thereby utilizing the heat, which is generated in the process of generating the calcium hydroxide by reacting the calcium oxide with the water, in the evaporative process.

The sludge of calcium sulfate (CaSO$_4$) and calcium nitrate (CaNO$_3$) components is produced and deposited as byproducts in the reaction tank 720 according to the reaction, and the deposited sludge is conveyed and supplied to the sludge storage tank 730 by separate conveyance means (not shown).

The conveyance means is not specifically limited as long as the sludge can be smoothly conveyed. The conveyance means may be a screen-type rotator.

In addition, the reaction tank 720 may be provided with contact rate improving means (not shown) for improving the contact intensity between the supplied calcium hydroxide and the supplied wasted acid to maximize the reaction efficiency. Rotating means for rotating the components stored therein or stirring means for stirring the components may be utilized as the contact rate improving means.

According to the exothermic reaction in the reaction tank 720, a part of the stored water is heated and is positioned at the lower side at a high temperature, and other part is vaporized and then collected at the upper side. The steam collected at the upper side can be supplied to the steam motor 740, and the hot water of the lower side can be discharged outwardly and recycled for heating.

That is, as the calcium hydroxide and the wasted acid are respectively neutralized in the reaction tank 720, the steam having thermal energy is produced according to the exothermic reaction, and the hot water and the steam are produced as useful byproducts.

The sludge storage tank 730 stores the sludge, such as calcium sulfate or calcium nitrate, produced and supplied according to the reaction, and the stored sludge can be discharged outwardly and appropriately recycled as an industrial raw material.

The steam motor 740 is operated by the steam supplied from the reaction tank 720 to generate the energy, that is, the steam motor 740 converts the thermal energy of steam to kinetic energy.

The steam motor 740 may be a steam engine capable of generating the kinetic energy by the thermal energy of the steam, or a steam turbine capable of generating rotational energy by the thermal energy of the steam.

In a case where the steam motor 740 is a steam turbine, a separate generator (not shown) is operated by the rotary energy generated by the steam turbine to produce electricity. The produced electricity can be immediately supplied to and used for necessary portions, or can be stored in a storage medium such as a battery.

Figure 15:
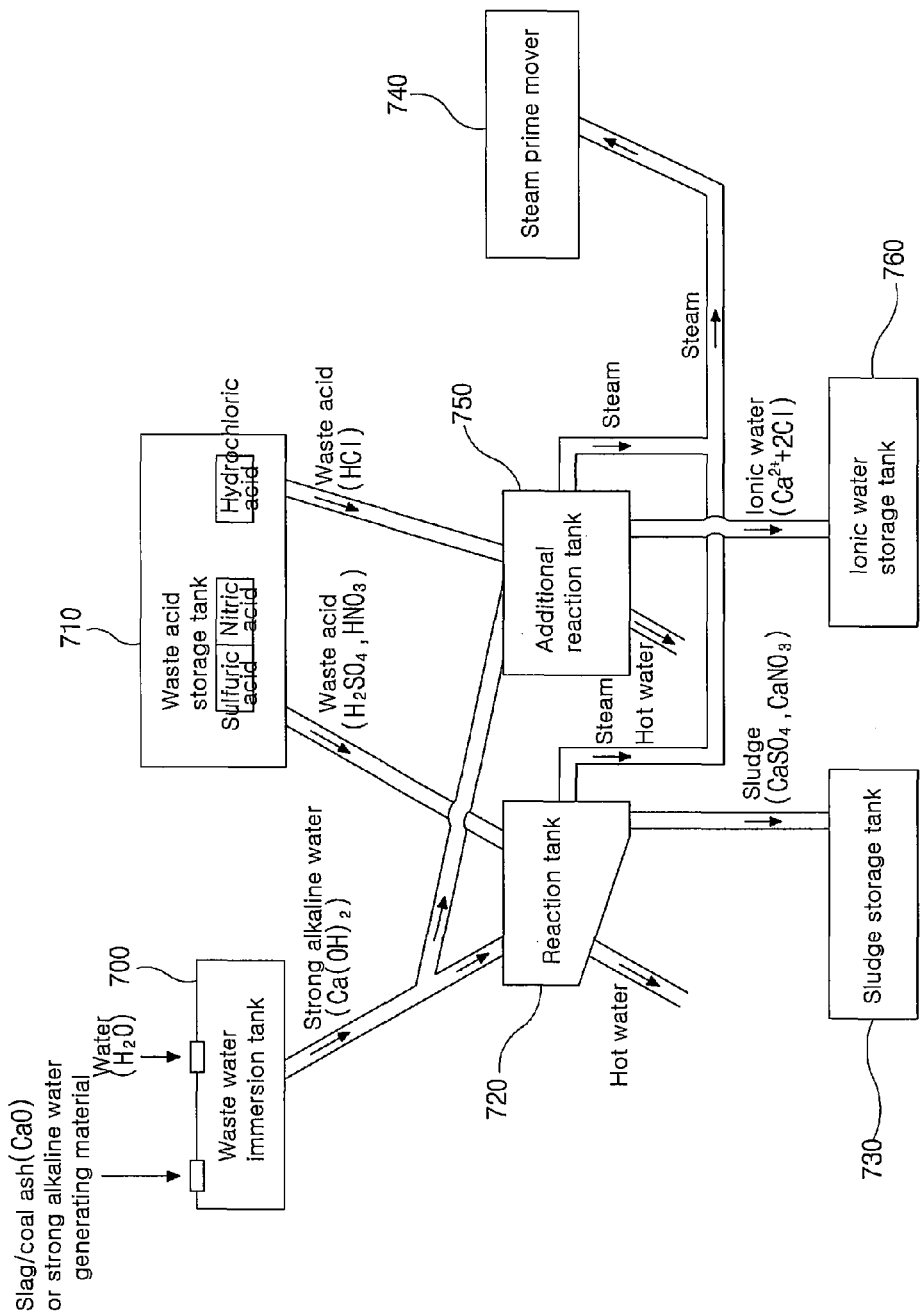
FIG. 15 is a schematic view showing a system for reducing environmental pollutants in accordance with a fourteenth exemplary embodiment of the present invention.

FIG. 15 is a schematic view showing a system for reducing environmental pollutants according to the fourteenth embodiment of the present invention. The system for reducing environmental pollutants according to the fourteenth embodiment of the present invention includes an additional reaction tank 750 producing the steam by the reaction between calcium hydroxide and hydrochloric acid (HCl) in the wasted acid, and an ionized water storage tank 760 storing ionized water supplied from the additional reaction tank 750, as well as all configurations of the system for reducing environmental pollutants according to the eleventh embodiment of the present invention.

As shown in FIG. 15, the additional reaction tank 750 heats the stored water by high heat resulting from the following chemical exothermic reaction between the calcium carbonate

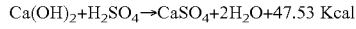

and the hydrochloric acid which are respectively supplied from the waste water soaking tank 700 and the wasted acid storage tank 710 to produce the steam, and then supplies the produced steam to the steam motor 740.

$$Ca(OH)_2 + 2HCl \rightarrow CaCl_2 + 2H_2O + 46.8 \text{ Kcal}$$

That is, the high heat corresponding to 46.8 Kcal is produced by the reaction between the calcium hydroxide and the hydrochloric acid, and the stored water is heated to 100° C. or more by the produced high heat, so that the water is converted into the steam of a high temperature.

In a case where the generated amount of high heat is further increased in the additional reaction tank 750 to increase the evaporative efficiency, a part of calcium oxide is directly put in the additional reaction tank 750, thereby utilizing the heat, which is generated in the process of generating the calcium hydroxide by reacting the calcium oxide with the water, in the evaporative process.

The ionized water of $Ca^{2+}$ (aq)+$2Cl^-$ (aq) is produced as a byproduct according to the reaction, and the produced ionized water is conveyed to and stored in the ionized water storage 760.

In addition, the additional reaction tank 750 may be provided with contact rate improving means (not shown) for improving the contact intensity between the calcium hydroxide and the hydrochloric acid to maximize the reaction efficiency. Rotating means for rotating the components stored therein or stirring means for stirring the components may be utilized as the contact rate improving means.

According to the exothermic reaction in the additional reaction tank 750, a part of the stored water is heated and is positioned at the lower side at a high temperature, and the other part is vaporized and then collected at the upper side. The steam collected at the upper side can be supplied to the steam motor 740, and the hot water of the lower side can be discharged outwardly and recycled for heating.

That is, as the calcium hydroxide and the hydrochloric acid are respectively neutralized in the additional reaction tank 750, the steam having thermal energy is produced according to the exothermic reaction, and the hot water and the ionized water are produced as useful byproducts.

In order to supply the hydrochloric acid to the additional reaction tank 750, the wasted acid storage tank 710 can store and supply the hydrochloric acid separately, and the supply is performed by a transmitting pump (not shown).

The ionized water storage 760 stores the ionized water of a $Ca^{2+}$ (aq)+$2Cl^-$ (aq) component which is produced and supplied in accordance with the reaction of the additional reaction tank 750.

The ionized water storage 760 generally receives and stores the ionized water. However, if necessary, the ionized water storage 760 may be provided with heating means (not shown), so that the ionized water is dried by the high heat generated from the heating means, and thus is converted into calcium chloride ($CaCl_2$) of a solid state to be stored.

Accordingly, as well as the steam produced from the reaction tank 720, the steam produced from the additional reaction tank 750 is used to operate the steam motor 740, thereby increasing the output of the energy.

Figure 16:
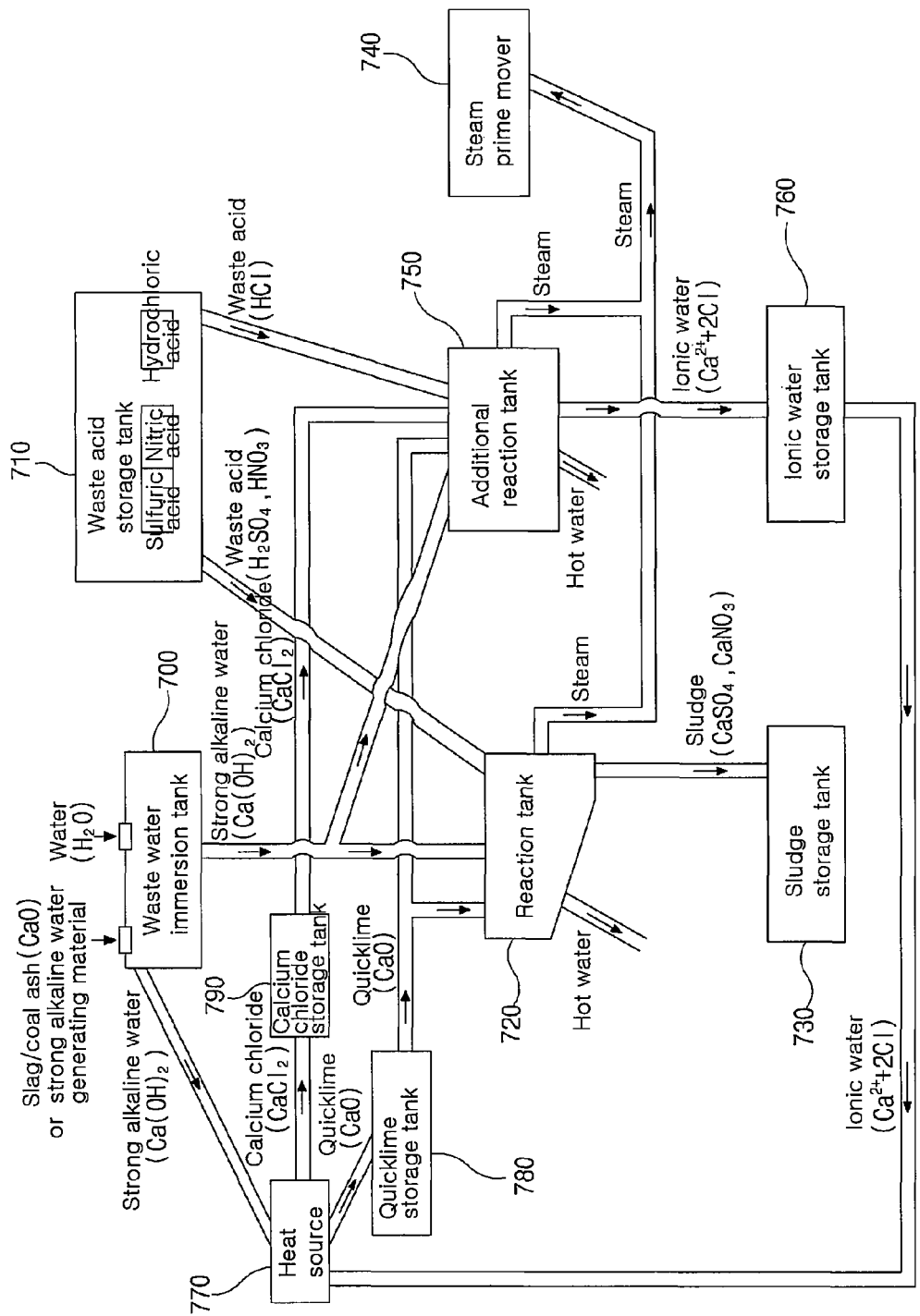
FIG. 16 is a schematic view showing a system for reducing environmental pollutants in accordance with a fifteenth exemplary embodiment of the present invention.

FIG. 16 is a schematic view showing a system for reducing environmental pollutants according to the fifteenth embodiment of the present invention. The system for reducing environmental pollutants according to the fifteenth embodiment of the present invention includes a heat source 770 which produces the calcium oxide by decomposing the strong alkaline water of a calcium hydroxide component, which is supplied from the waste water soaking tank 700, with high heat, and produces calcium chloride by drying the ionized water, which is supplied from the ionized water storage 760, with high heat, a calcium oxide storage tank 780 which stores the calcium oxide produced and supplied from the heat source 770, and selectively supplies it to the waste water soaking tank 700, the reaction tank 720 and the additional reaction tank 750, and a calcium chloride storage tank 790 which stores the calcium chloride produced and supplied from the heat source 770, and supplies it to the additional reaction tank 750, as well as the configuration of the system for reducing environmental pollutants according to the fourteenth embodiment of the present invention.

In general, various industrial sites are provided with the heat source 770 such as a heat engine as a necessary power source, and such a heat source 770 is utilized in the fifteenth embodiment.

Herein, the heat source 770 is configured to produce high heat of 580° C. or more according to its operation. That is, the heat source may be an internal combustion engine, an external combustion engine or a boiler which produces high heat by combusting a fuel, or may be a flue which is heated by itself while discharging exhaust gas of a high temperature The heat source 770 produces the high heat to decompose the strong alkaline water of the calcium hydroxide component, which is supplied from the waste water soaking tank 700, with hot high and produce the calcium oxide according to the following reaction equation. The produced calcium oxide is conveyed to and stored in the calcium oxide storage tank 780.

$$Ca(OH)_2 \text{ (heating to 580° C. or more)} \rightarrow CaO + 2H_2O$$

That is, since the calcium hydroxide is decomposed by heat of 580° C. or more, the calcium hydroxide can be sufficiently decomposed by the high heat transferred from the heat source 770 which generally produces the high heat of 1000° C. or more.

In addition, the heat source 770 produces the calcium chloride by drying the ionized water, which is supplied from the ionized water storage 760, and the produced calcium chloride is conveyed to and stored in the calcium chloride storage tank 790.

The calcium oxide storage tank 780 stores the calcium oxide produced and supplied from the heat source 770 according to the decomposition reaction, and the stored calcium oxide is selectively supplied to the waste water soaking tank 700, the reaction tank 720 and the additional reaction tank 750.

Accordingly, the calcium oxide supplied from the calcium oxide storage tank 780 to the waste water soaking tank 700 can be used in the production of the calcium hydroxide, while the calcium oxide supplied from the calcium oxide storage tank 780 to the reaction tank 720 and the additional reaction tank 750 is reacted with the stored water in the reaction tank 720 and the additional reaction tank 750 to produce the calcium hydroxide and the high heat thereby improving the evaporative efficiency.

The surplus calcium oxide stored in the calcium oxide storage tank 780 can be discharged outwardly, and appropriately recycled as an industrial raw material.

The calcium chloride storage tank 790 stores the calcium chloride produced and supplied from the heat source 770, and supplies the stored calcium chloride to the additional reaction tank 750.

Accordingly, the calcium chloride supplied from the calcium chloride storage tank 790 to the additional reaction tank 750 is reacted with the stored water in the additional reaction tank 750 to produce high heat according to the following reaction equation, thereby improving the evaporative efficiency:

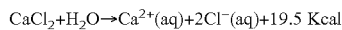

Of course, the conveyance of the calcium oxide and the calcium hydroxide produced from the heat source 770 can be performed by an appropriate method such as pneumatic conveyance, hydraulic conveyance, conveyor conveyance, run-off conveyance or the like.

In addition, the system for reducing environmental pollutants according to the fifteenth embodiment of the present invention may further include a control panel which implements the whole operation control for automatic operation. Furthermore, the respective supply pipes, through which the corresponding fluid flows, may be provided with valve means (not shown) for opening and closing the supply of the fluid, a pressure gauge (not shown) and a flowmeter (not shown) for measuring pressure and flow rate of the fluid, and backflow cutoff means (not shown) for preventing backflow of the fluid at desired positions.

Furthermore, the waste water soaking tank 700, the wasted acid storage tank 710, the reaction tank 720 and the additional reaction tank 750 may be provided with pH measuring means (not shown) for measuring the concentration of hydrogen ions.

The operation of the system for reducing environmental pollutants including the above configuration according to the fifteenth embodiment of the present invention will be described.

First, the waste water soaking tank 700, the reaction tank 720 and the additional reaction tank 750 are filled with water of a determined amount.

Then, the slag of industrial waste produced and collected in the steel manufacturing process or the like is introduced into the waste water soaking tank 700, and the wasted acid of industrial waste produced and collected at various industrial sites is separated and stored in the wasted acid liquid storage tank 710 according to types.

The water stored in the waste water soaking tank 700 is reacted with the calcium oxide contained in the slag which is introduced from the exterior to produce the strong alkaline water of calcium hydroxide, and then the produced alkaline water is supplied to the reaction tank 720 and the additional reaction tank 750.

Meanwhile, the sulfuric acid and the nitric acid among the wasted acid stored in the wasted acid liquid storage tank 710 according to types are supplied to the reaction tank 720, and the hydrochloric acid is supplied to the additional reaction tank 750.

The supplied calcium hydroxide is exothermically reacted with the sulfuric acid and the nitric acid in the reaction tank 720 to produce the high heat, and a part of the water in the reaction tank 720 is vaporized by the produced high heat to produce the steam.

The supplied calcium hydroxide is exothermically reacted with the hydrochloric acid in the additional reaction tank 750 to produce the high heat, and a part of the water in the additional reaction tank 750 is vaporized by the produced high heat to produce the steam.

The steam of the high heat produced from the reaction tank 720 and the additional reaction tank 750 is supplied to the steam motor 740 to operate the steam motor, so that the steam motor 740 produces the kinetic energy.

Of course, the kinetic energy produced by the steam motor 740 is conveyed to other device, or operates a generator to produce the electrical energy.

Meanwhile, the sludge of calcium sulfate and calcium nitrate is produced and deposited as a byproduct in the reaction tank 720 according to the reaction, and the deposited sludge is conveyed to and stored in the sludge storage tank 730 by separate conveyance means.

The ionized water of a $Ca^{2+}$ (aq)+$2Cl^-$ (aq) component is produced in the additional reaction tank 750 according to the reaction, and the produced ionized water is conveyed to and stored in the ionized water storage 760.

The sludge stored in the sludge storage tank 730 can be discharged outwardly and appropriately recycled as an industrial raw material.

According to the exothermic reaction in the reaction tank 720 and the additional reaction tank 750, a part of the stored water is heated and thus exists as the hot water, so that the hot water can be discharged outwardly from the reaction tank 720 and the additional reaction tank 750 and recycled for heating.

Meanwhile, a part of the calcium hydroxide produced from the waste water soaking tank 700 is supplied to the heat source 770, and then is decomposed by the high heat produced by the heat source 770 to produce the calcium oxide. The produced calcium oxide is supplied to and stored in the calcium oxide storage tank 780.

In addition, the calcium oxide stored in the calcium oxide storage tank 780 is supplied to the reaction tank 720 and the additional reaction tank 750, if necessary, and then is reacted with the stored water in the reaction tank 720 and the additional reaction tank 750 to produce the calcium hydroxide, the high heat thereby improving the evaporative efficiency, or is supplied to the waste water soaking tank 700 to be recycled for production of the calcium hydroxide.

The calcium oxide stored in the calcium oxide storage tank 780 can be discharged outwardly, and be appropriately recycled as an industrial raw material.

In addition, the heat source 770 produces the calcium chloride by drying the ionized water, which is supplied from the ionized water storage 760, and the produced calcium chloride is conveyed to and stored in the calcium chloride storage tank 790.

Furthermore, the calcium chloride stored in the calcium chloride storage tank 790 is supplied to the additional reaction tank 750, and then is reacted with the stored water in the additional reaction tank 750 to produce the high heat according to the exothermic reaction, thereby improving the evaporative efficiency, or is discharged outwardly and recycled as an industrial raw material.

Meanwhile, the systems for reducing environmental pollutants according to the first to fifteenth embodiments of the present invention can be appropriately installed in combination. In this instance, the recycling of the resources can be implemented by supplying back output results of one system and using them as an input of another system. As a result, it is possible to minimize the resource consumption and reduce the maintenance expense.

With the present invention, since the energy required in the industrial sites is produced by using the slag and the wasted acid which are industrial waste produced in bulk at the industrial sites, and the slag and the wasted acid which are industrial waste are treated to be harmless (neutralization treatment), it is possible to produce the energy and treat the waste without consuming additional expense, thereby providing huge economical benefits.

In addition, it is possible to prevent pollution of aquatic environments due to leachate resulting from landfill treatment of the slag or illegal emissions of the slag.

Furthermore, since recyclable byproducts, such as calcium sulfate, calcium nitrate, calcium oxide, calcium chloride, and hot water, are obtained, the economical benefits and the usefulness can be provided.

Also, since the raw substance is partially recycled and reused, only a small quantity of raw substance is needed, thereby providing the economical benefits.

The present invention is not limited to the embodiments described herein. It is to be understood for those skilled in the prior art that the present invention may be variously modified without departing from the spirit or scope of the invention.

The invention claimed is:

1. A system for reducing environmental pollutants, the system comprising:
    a first water immersion tank receiving bottom ash, which is generated from a furnace and is collected on a bottom of the furnace, and reacting the bottom ash with water stored therein, and producing strong alkaline water;
    an elimination reaction tank provided on a flue extending from the furnace, storing the strong alkaline water supplied from the first water immersion tank therein, and removing carbon compounds contained in exhaust gases discharged through the flue;
    a sludge storage tank receiving and storing sludge produced by an elimination reaction in the elimination reaction tank;
    a first aggregate storage tank receiving and storing bottom-ash aggregate, which remains in the first water immersion tank after being neutralized with the produced strong alkaline water; and
    a second water immersion tank receiving fly ash, which is generated from the furnace and is collected by a dust collector on the flue, reacting the fly ash with water stored therein, producing strong alkaline water, and supplying the produced strong alkaline water to the elimination reaction tank.

2. The system set forth in claim 1, further comprising a second aggregate storage tank receiving and storing fly-ash aggregate, which remains in the second water immersion tank after being neutralized with the produced strong alkaline water.

3. The system set forth in claim 2, further comprising:
    a supply pipe supplying the strong alkaline water, which is produced from the first and second water immersion tanks, to the elimination reaction tank; and
    a valve means provided on the supply pipe and selectively opened and closed to regulate the supply of the strong alkaline water from the first or second water immersion tank to the elimination reaction tank.

4. The system set forth in claim 2, wherein the first and second water immersion tanks include impactors, which give repetitive impact to the bottom and fly ash stored therein, and extract a calcium oxide component for producing the strong alkaline water.

5. The system set forth in claim 2, wherein the elimination reaction tank includes means for improving a contact proportion between the strong alkaline water and the exhaust gases, and the contact proportion improving means includes one selected from means for rotating the strong alkaline water, means for agitating the strong alkaline water, means for subdividing and injecting the exhaust gases, and means for aerating and injecting the exhaust gases.

6. The system set forth in claim 2, wherein the first and second aggregate storage tanks include aggregate outlets for drawing out the aggregate stored therein.

7. The system set forth in claim 2, wherein the sludge storage tank includes a sludge outlet for drawing out the sludge stored therein in an undried or dried state.

8. A system for reducing environmental pollutants, the system comprising:
    a biogas supply unit supplying biogas; a biogas conveyance pipe conveying the biogas supplied from the biogas supply unit;
    a purification tank which is provided on the biogas conveyance pipe, brings carbon compounds, which are contained in the biogas passing through the biogas conveyance pipe, into contact with strong alkaline water stored therein, and removes the carbon compounds to increase a content of methane contained in the biogas;
    a biogas storage tank storing the biogas purified by passing through the purification tank therein;
    a furnace burning the purified biogas supplied from the biogas storage tank to generate high-temperature heat;
    an exhaust gas discharge pipe conveying and discharging exhaust gases generated from the furnace by combustion;
    and an elimination reaction tank which is provided on the exhaust gas discharge pipe, brings carbon compounds, which are contained in the exhaust gases passing through the exhaust gas discharge pipe, into contact with strong alkaline water stored therein, and removes the carbon compounds.

9. The system set forth in claim 8, further comprising a sludge storage tank, which receives and stores sludge produced by an elimination reaction in the purification tank.

10. The system set forth in claim 8, wherein the strong alkaline water includes a calcium hydroxide component produced by a contact reaction of calcium oxide with water, and the sludge includes a calcium carbonate component produced by a contact reaction of the calcium hydroxide component with the carbon compounds.

11. The system set forth in claim 8, further comprising a waste water immersion tank, which receives one of slag, coal ash, calcium hydroxide ($Ca(OH)_2$), sodium hydroxide (NaOH), and potassium hydroxide (KOH), produces the strong alkaline water by a contact reaction of the supplied material with water stored therein, and supplies the produced strong alkaline water to the purification tank.

12. The system set forth in claim 8, further comprising:
    a sludge storage tank receiving and storing sludge produced by an elimination reaction in the purification tank and the elimination reaction tank;
    a decomposition tank decomposing the sludge supplied from the sludge storage tank using high-temperature heat generated from the furnace to produce calcium oxide;
    a calcium oxide storage tank receiving and storing the calcium oxide from the decomposition tank and supplying the calcium oxide to the purification tank and the elimination reaction tank or the waste water immersion tank; and
    a carbon dioxide collection tank receiving and storing carbon dioxide produced by a dissolution reaction in the decomposition tank.

13. A system for reducing environmental pollutants, the system comprising:
    a biogas storage tank, in which biogas is stored;
    a furnace burning the biogas supplied from the biogas storage tank to generate high-temperature heat;
    an exhaust gas discharge pipe conveying and discharging exhaust gases generated by combustion in the furnace;

an elimination reaction tank which is provided on the exhaust gas discharge pipe, brings carbon compounds, which are contained in the exhaust gases passing through the exhaust gas discharge pipe, into contact with strong alkaline water stored therein, and removes the carbon compounds;

a waste water immersion tank, which receives one of slag, coal ash, calcium hydroxide ($Ca(OH)_2$), sodium hydroxide (NaOH), and potassium hydroxide (KOH), produces the strong alkaline water of a calcium hydroxide component by a contact reaction of the supplied material with water stored therein, and supplies the produced strong alkaline water to the elimination reaction tank;

a sludge storage tank receiving and storing sludge produced by an elimination reaction in the elimination reaction tank; and a decomposition tank decomposing the sludge supplied from the sludge storage tank using the high-temperature heat generated from the furnace to produce calcium oxide that is a raw material required to produce the strong alkaline water.

14. The system set forth in claim 13, further comprising: a calcium oxide storage tank receiving and storing the calcium oxide from the decomposition tank and supplying the calcium oxide to the waste water immersion tank; and a carbon dioxide collection tank receiving and storing carbon dioxide produced by a dissolution reaction in the decomposition tank.

15. The system set forth in claim 13, wherein the furnace is one selected from a boiler, an internal combustion engine, an external combustion engine, a steam engine, a cogeneration facility, and a heat exchanger.

16. A system for reducing environmental pollutants, the system comprising:
a waste water immersion tank storing water therein and producing strong alkaline water;
a gas supply pipe supplying carbon compounds;
an elimination reaction tank receiving and storing the strong alkaline water from the waste water immersion tank and removing the carbon compounds introduced through the gas supply pipe using the strong alkaline water; and
an acid neutralization tank neutralizing strong acid emissions supplied through a strong acid supply pipe using the strong alkaline water.

17. The system set forth in claim 16, further comprising:
a gas pressurizer supplying the carbon compounds, which are supplied through the gas supply pipe, under pressure; and
a second elimination storage tank additionally removing the carbon compounds, which are primarily removed in and supplied from the elimination storage tank, using the strong alkaline water;
wherein the strong alkaline water in the second elimination storage tank is moved back to the elimination storage tank after being used for an elimination reaction, and is used again for the elimination reaction.

18. The system set forth in claim 16, further comprising: a strong alkaline water neutralization tank receiving the strong alkaline water from the elimination reaction tank or the waste water immersion tank and neutralizing the supplied strong alkaline water with carbon dioxide; and a carbon dioxide generator supplying the carbon dioxide from the strong alkaline water neutralization tank.

19. The system set forth in claim 18, wherein: the carbon compounds are supplied to the strong alkaline water neutralization tank; the carbon dioxide generator reacts sludge, which is produced as a byproduct from the strong alkaline water neutralization tank, the elimination reaction tank, or the acid neutralization tank, with an acid solution, and generates the carbon dioxide; and the carbon dioxide gas remaining in a process of neutralizing the strong alkaline water in the strong alkaline water neutralization tank is supplied to the elimination reaction tank.

20. The system set forth in claim 18, further comprising a strong alkali supply pipe supplying strong alkali emissions to be neutralized to the acid neutralization tank or the strong alkaline water neutralization tank.

21. The system set forth in claim 16, further comprising: a second acid neutralization tank receiving the strong alkaline water from the waste water immersion tank, receiving the strong acid emissions via the strong acid supply pipe, and secondarily neutralizing the strong acid emissions, which are primarily neutralized in the acid neutralization tank, with a strong alkaline element; and a strong alkali supply pipe supplying strong alkali emissions to be neutralized to the second acid neutralization tank.

22. The system set forth in claim 16, further comprising a sludge storage tank, which collects sludge generated as a byproduct in the acid neutralization tank, dries the sludge, and stores the sludge in a dried state.

23. The system set forth in claim 16, further comprising a slag neutralization tank, which immerses slag aggregate supplied from the waste water immersion tank into water, and neutralizes the slag aggregate using carbon dioxide supplied from a carbon dioxide generator, carbonated water supplied from a carbonated water producer, or a drying method of directly spraying the carbon dioxide, wherein sludge generated as a byproduct in the slag neutralization tank is used to produce the carbon dioxide, or is collected and stored.

24. A system for reducing environmental pollutants, the system comprising:
a strong alkaline water supply pipe supplying strong alkaline water;
a gas supply pipe supplying carbon compounds;
an elimination reaction tank receiving and storing the strong alkaline water from the strong alkaline water supply pipe, and removing the carbon compounds introduced through the gas supply pipe using the strong alkaline water;
a strong alkaline water neutralization tank receiving the strong alkaline water from the elimination reaction tank or the strong alkaline water supply pipe and neutralizing the supplied strong alkaline water with carbon dioxide;
a strong acid supply pipe supplying strong acid emissions to be neutralized; and
an acid neutralization tank neutralizing the strong acid emissions supplied through the strong acid supply pipe using the strong alkaline water supplied from the strong alkaline water supply pipe.

25. The system set forth in claim 24, wherein: the carbon dioxide used in the strong alkaline water neutralization tank is supplied from the gas supply pipe or a carbon dioxide generator; the carbon compounds flowing into the elimination reaction tank are supplied from the gas supply pipe or the strong alkaline water neutralization tank; and the strong alkaline water supplied through the strong alkaline water supply pipe is produced and supplied using sludge produced as a by-product from the elimination reaction tank or the strong alkaline water neutralization tank.

26. A system for reducing environmental pollutants, the system comprising at least one neutralization section having:
a slag inflow pipe to which slag is supplied;
a slag impactor installed so as to be located in carbonated water, applying predetermined impact to extract calcium oxide remaining in the slag, and causing the extracted calcium oxide to react with the carbonated water to neutralize the slag; and a slag discharger discharging the neutralized slag to an outside.

27. The system set forth in claim 26, wherein the carbonated water includes saturated carbon dioxide, and the at least one neutralization section further includes a carbonated water inflow pipe additionally supplying the carbonated water.

28. The system set forth in claim 26, wherein the at least one neutralization section further includes a carbon dioxide inflow pipe supplying carbon dioxide for producing the carbonated water, and the carbon dioxide reacts with water loaded on the at least one neutralization section to produce the carbonated water.

29. The system set forth in claim 26, further comprising a carbon dioxide generator producing carbon dioxide using sludge produced by a neutralization reaction of the carbonated water, and the carbon dioxide generated from the carbon dioxide generator is used to produce the carbonated water.

30. The system set forth in claim 29, wherein the carbon dioxide generator causes the sludge to react with an acid solution to produce the carbon dioxide.

31. The system set forth in claim 29, further comprising a carbonated water producer interposed between the at least one neutralization section and the carbon dioxide generator and dissolving the carbon dioxide produced from the carbon dioxide generator into water to produce the carbonated water.

32. A system for reducing environmental pollutants, the system comprising:
a neutralization tank storing air and carbonated water in which carbon dioxide is included in a supersaturated state, and neutralizing alkaline leachate and producing sludge using the carbon dioxide;
a carbon dioxide generator reacting an acid solution with the sludge to produce the carbon dioxide and supplying the carbon dioxide to the neutralization tank; and
a carbonated water producer producing the carbonated water using the carbon dioxide produced from the carbon dioxide generator, and supplying the carbonated water to the neutralization tank.

33. The system set forth in claim 32, wherein the neutralization tank is configured so that the alkaline leachate falls down to the air and the carbonated water, in which carbon dioxide is included in a supersaturated state, due to gravity, and the system further comprises a fine sludge processing tank to which fine sludge produced by a reaction of the alkaline leachate with the carbon dioxide in the air and the carbonated water is supplied.

34. The system set forth in claim 32, wherein the carbon dioxide generator includes: a sludge supply pipe introducing the sludge produced from the neutralization tank; an acid storage section in which the acid solution is stored; and a carbon dioxide generation section communicating with the sludge supply pipe and the acid storage section, and generating the carbon dioxide by a reaction of the sludge and the acid solution.

35. The system set forth in claim 32, further comprising a sludge drying section communicating with the sludge supply pipe and dehydrating and drying the sludge.

36. A system for reducing environmental pollutants, the system comprising:

a waste water immersion tank storing water therein and producing strong alkaline water;
a reaction tank heating the water stored therein by a reaction of the strong alkaline water supplied from the waste water immersion tank and waste acid supplied from a waste acid storage tank, and generating steam;
a steam prime mover driven to produce energy using the steam supplied from the reaction tank;
a sludge storage tank receiving and storing sludge produced by a reaction in the reaction tank;
a heat source decomposing the strong alkaline water supplied from the waste water immersion tank with high-temperature heat to produce calcium oxide; and
a calcium oxide storage tank receiving and storing the calcium oxide from the heat source and supplying the calcium oxide to the reaction tank.

37. The system set forth in claim 36, wherein the waste water immersion tank receives one of slag including the calcium oxide, calcium hydroxide ($Ca(OH)_2$), sodium hydroxide (NaOH), and potassium hydroxide (KOH), and the steam prime mover is a steam engine that obtains reciprocation energy using heat energy of the steam or a steam turbine that obtains rotation energy using heat energy of the steam.

38. The system set forth in claim 36, wherein the waste acid storage tank stores and supplies first waste acid in which sulfuric acid and nitric acid are main components, and the reaction tank receives the first waste acid and causes the first waste acid to react with the strong alkaline water.

39. The system set forth in claim 38, wherein:
the waste acid storage tank stores and supplies second waste acid in which hydrochloric acid is a main component;
the system further comprises an additional reaction tank heating water stored therein by a reaction of the strong alkaline water supplied from the waste water immersion tank and the second waste acid supplied from the waste acid storage tank to thereby produce steam, and an ionized water storage tank receiving and storing ionized water produced by a reaction in the additional reaction tank;
the heated water in the reaction tank and the additional reaction tank is drawn out and reused; and
the sludge in the sludge storage tank is drawn out and reused.

40. The system set forth in claim 39, wherein:
the heat source receives the ionized water from the ionized water storage tank, and evaporates the ionized water with high-temperature heat to produce calcium chloride;
the calcium oxide storage tank supplies the stored calcium oxide to the additional reaction tank; and
the system further comprises a calcium chloride storage tank receiving and storing the calcium chloride from the heat source and supplying the calcium chloride to the additional reaction tank.

41. The system set forth in claim 40, wherein: the heat source is one selected from an internal combustion engine, an external combustion engine, and a flue; the calcium oxide stored in the calcium oxide storage tank is supplied to the waste water immersion tank; and the calcium oxide in the calcium oxide storage tank and the calcium chloride in the calcium chloride storage tank are drawn out and reused.

* * * * *